US008502731B2

(12) United States Patent
Martone et al.

(10) Patent No.: US 8,502,731 B2
(45) Date of Patent: Aug. 6, 2013

(54) SYSTEM AND METHOD FOR MOVING TARGET DETECTION

(75) Inventors: Anthony Frank Martone, Ellicott City, MD (US); Kenneth Irving Ranney, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 273 days.

(21) Appl. No.: 13/008,549

(22) Filed: Jan. 18, 2011

(65) Prior Publication Data

US 2012/0182173 A1 Jul. 19, 2012

(51) Int. Cl.
*G01S 13/00* (2006.01)

(52) U.S. Cl.
USPC .............................. 342/93; 342/160; 342/191

(58) Field of Classification Search
USPC ........................................... 342/93, 160, 191
See application file for complete search history.

(56) References Cited

PUBLICATIONS

Anthony Martone ; Kenneth Ranney and Roberto Innocenti "Clustering analysis of moving target signatures", Proc. SPIE 7669, Radar Sensor Technology XIV, 766912 (Apr. 27, 2010); doi:10.1117/12.852549.*
Anthony Martone, Roberto Innocenti, and Kenneth Ranney,"An Analysis of Clustering Tools for Moving Target Indication" ARL-TN-5037; US Army Research Laboratory: Adephi, MD, Nov. 2009.*
Anthony Martone, Roberto Innocenti, and Kenneth Ranney,"An Analysis of Clustering Tools for Moving Target Indication" ARLTN-5037; US Army Research Laboratory: Adephi, MD, Nov. 2009.*
A. Martone, K. Ranney, R. Innocenti, "Automatic Through the Wall Detection of Moving Targets using Low-Frequency Ultra-Wideband Radar," Proceedings of the IEEE International radar conference, Washington, DC, May 2010.
A. Martone, K Ranney, R. Innocenti, "An Analysis of Clustering Tools for Moving Target Indication," ARL-TN-5037; U. S. Army Research Laboratory: Adelphi, MD, Nov. 2009.
A. Martone, K. Ranney, R. Innocenti, "Through the wall detection of slow moving personnel;" Proceedings the SPIE conference on Radar Sensor Technology XIII, vol. 7308, Orlando, Fl, Apr. 2009.

(Continued)

*Primary Examiner* — Timothy A Brainard
(74) *Attorney, Agent, or Firm* — Lawrence E. Anderson

(57) ABSTRACT

A system and method of detecting moving targets comprises transmitting electromagnetic waves rays from a plurality of transmitters at sequential; receiving reflected waves into a plurality of receivers after each transmission; the compilation of the reflected waves from the plurality of receivers for each transmission representing a data frame; forming a signal that monitors changes between the two sets of frames; at least one processor operating to process and compare frames; forming a difference image using a back-projection algorithm; scanning the difference image using a constant false alarm rate (CFAR) window; the CFAR window scanning the entire difference image and identifying a list of points of interest and eliminating the sidelobe artifacts present in the difference image thereby creating CFAR images; processing the CFAR images using morphological processing to create a morphological image; determining the number of clusters present in the morphological image; using K-means clustering to indicate the centroid of each cluster; and tracking using a Kalman filter. The system comprises a plurality of M transmitters, a plurality of receivers, and at least one memory, the transmitters operating in sequence to transmit electromagnetic waves rays sequentially; the receivers receiving reflected waves after each transmission; the compilation of the reflected waves from the plurality of receivers for each transmission representing a data frame; at least one processor operating to perform the method.

19 Claims, 19 Drawing Sheets
(14 of 19 Drawing Sheet(s) Filed in Color)

Moving target indication system for data collected by a low-frequency, UWB radar.

PUBLICATIONS

A. Martone, K. Ranney, R. Innocenti, "Moving Target Indication for Transparent Urban Structures," ARL-TN-4809; U.S. Army Research Laboratory Acielphi, MD, May 2009.

A. Martone, K Ranney, R. Innocenti, "Clustering analysis of moving target signatures," Proceedings of the SPIE conference on Radar Sensor Technology XIV, Orlando, Fl, Apr. 2010.

A. Jain, "Fundamentals of Digital Image Processing," Prentice-Hall International, Englewood Cliffs, NJ, pp. 384-387 (1989).

Ressler, M.; et al., "The Army Research Laboratory (ARL) Synchronous Impulse Reconstruction (SIRE) Forward-Looking Radar," Proceedings of the SPIE Conference on Unmanned Systems Technology IX, vol. 6561, Bellingham, WA, Apr. 2007, 658105-1-666105-12.

McCorkle, J. "Focusing of Synthetic Aperture Ultra Wideband Data," Proceedings of the IEEE International Conference on Systems Engineering, Dayton, OH, Aug 1991, 1-5.

Novak, L. "Change Detection for Multi-polarization, Multi-pass SAR," Proceedings of the SPIE Conference on Algorithms for Synthetic Aperture Radar Imagery XII, vol. 5808, Orlando, FL, Mar. 2005, 234-246.

Gandhi, P. P et al., "Analysis of CFAR Processors in Homogeneous Background" IEEE Transactions on Aerospace and Electronic Systems Jul. 1988, 24 (4), 427-445.

Wilpon, J., et al., "A Modified K-means Clustering Algorithm for Use in Isolated Work Recognition," IEEE Transactions on Acoustics, Speech and Signal Processing vol. 33, No. 3, Jul. 1985, 587-594.

Duta, R.; Hart, P.; Stork, D. "Pattern Classification," 2nd ed. John Wiley and Sons Inc. New York, NY, pp. 542-548 (2001).

Thorndike, R. "Who belongs in the family?" Psychometrika Dec. 1953, 18 (4), 267-276.

Zhao, Q.; Xu, M.; Franti, P. "Knee Point Detection on Bayesian Information Criteria," Proceedings of the 20th IEEE International Conference on Tools with Artificial Intelligence, vol. 2, Nov. 2008, 431-438.

Farwell, M., et al., "Sense through the wall system development and design considerations," J. of the Franklin Institute Sep. 2008, 345 (6), 570-591.

\* cited by examiner

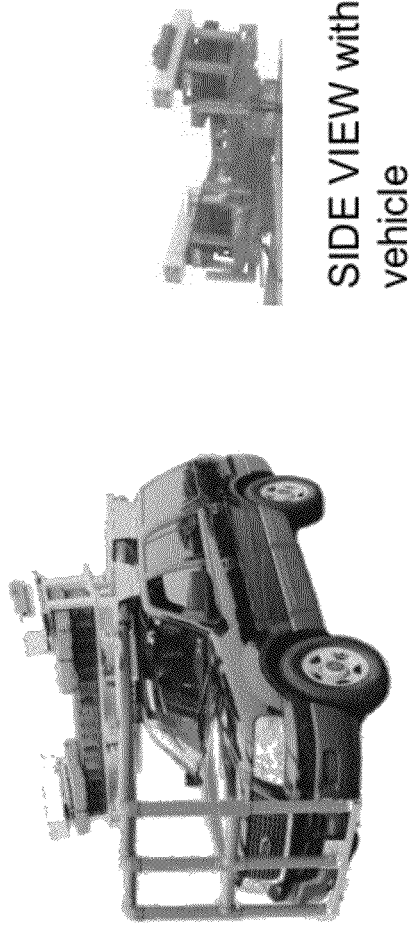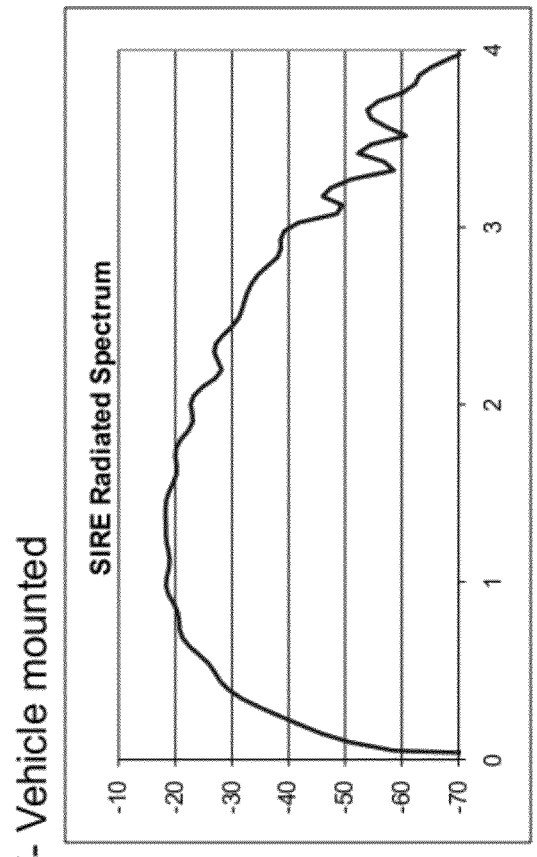
FIG. 1 Synchronous Impulse Reconstruction (SIRE) Radar

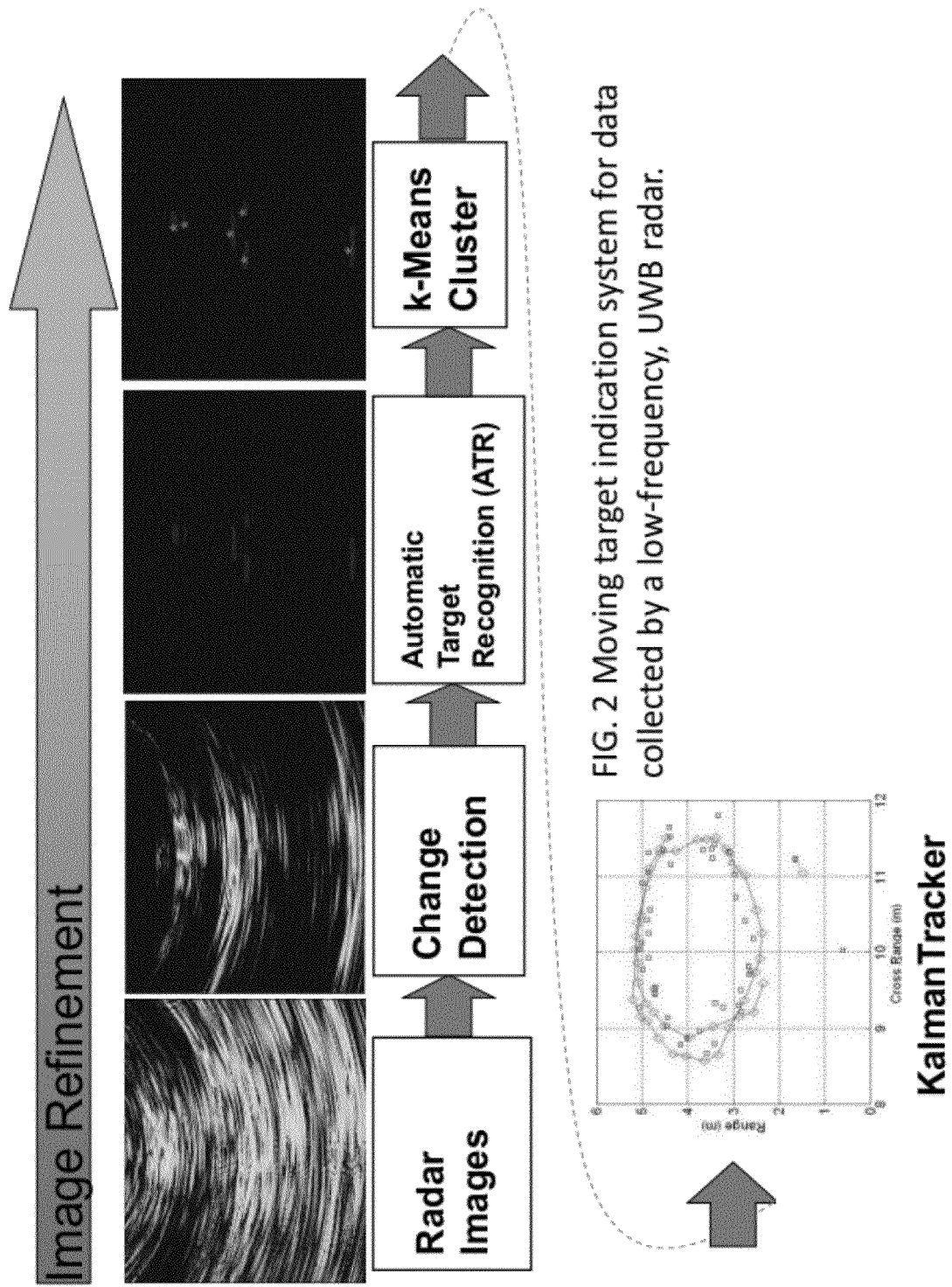
FIG. 2 Moving target indication system for data collected by a low-frequency, UWB radar.

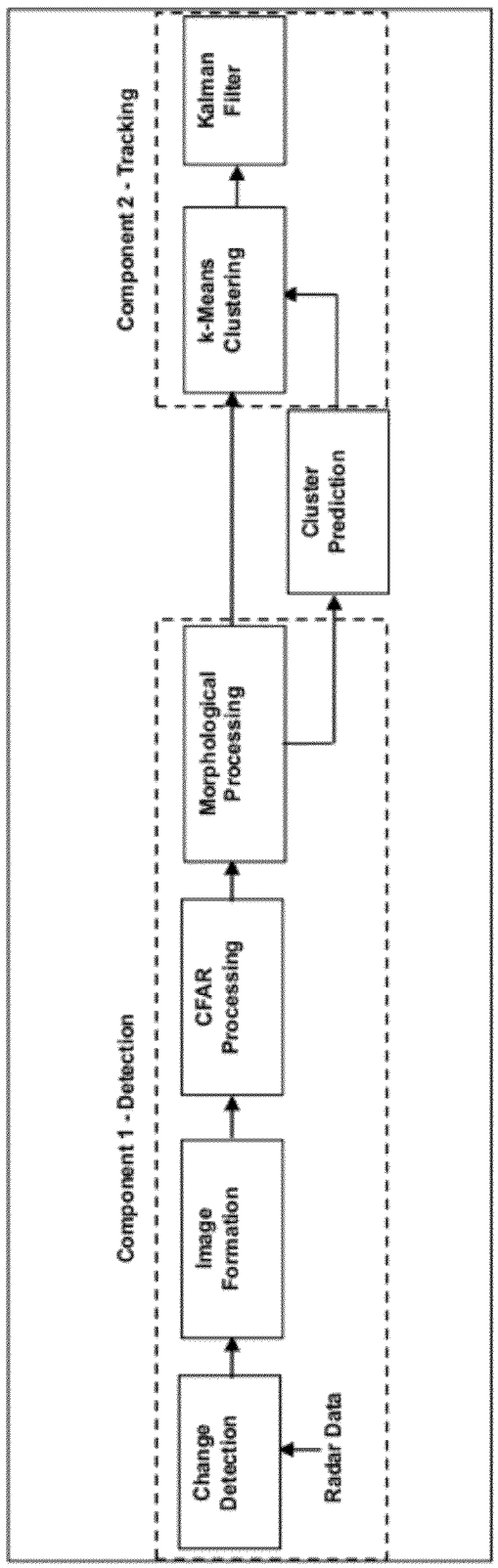
FIG. 3: Moving target indication system for data collected by a low-frequency, UWB radar.

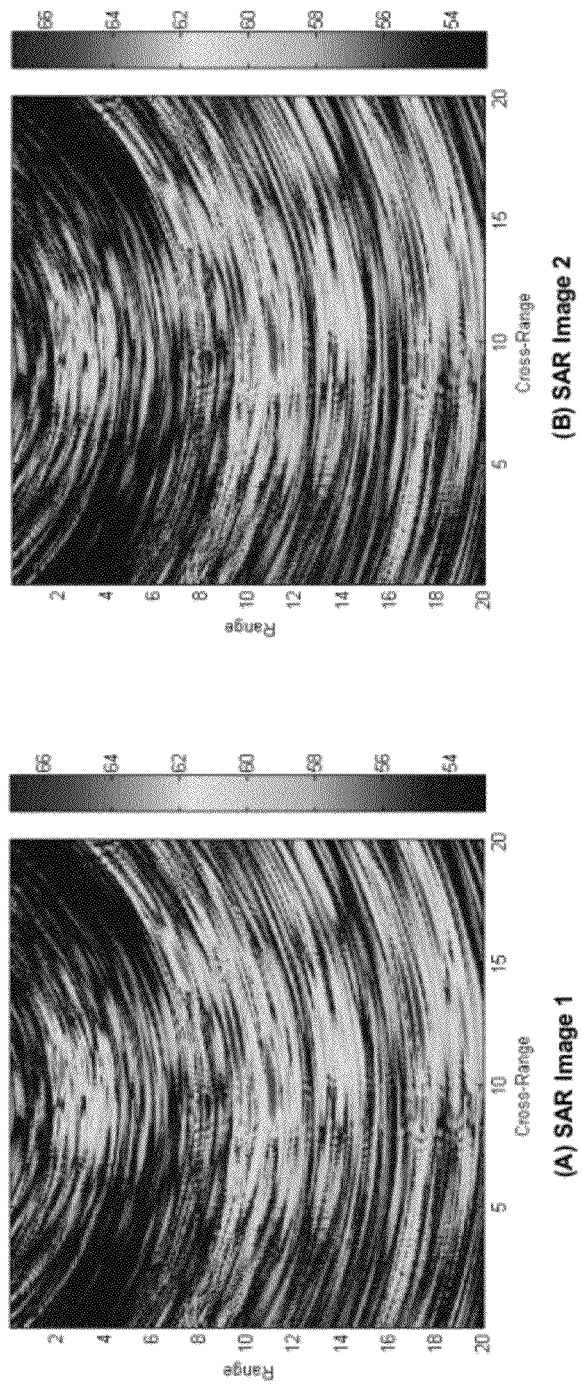
Figure 4. Two SAR images of a target area with a moving target present; the location of the mover is unknown.

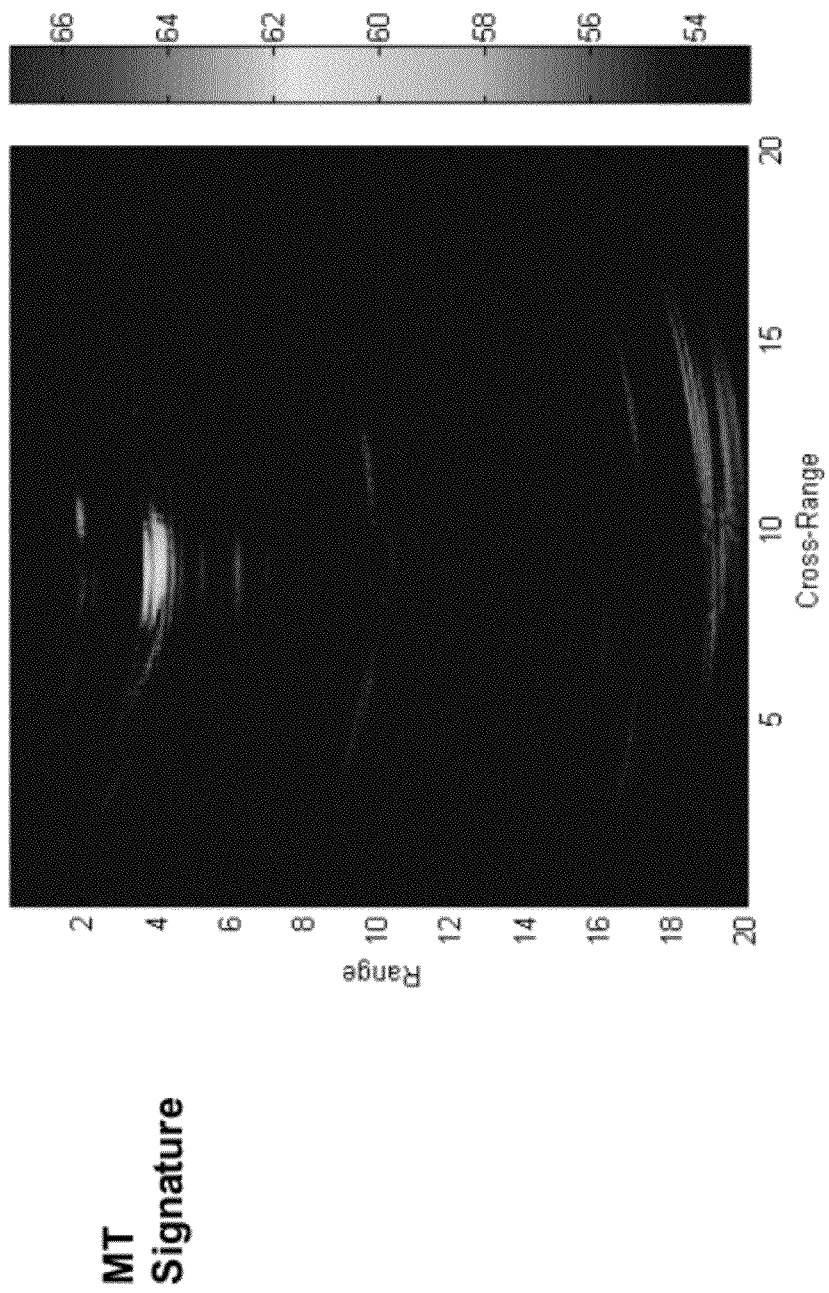
FIG. 5 - Difference image generated by applying change detection to the SAR images in FIG. 4; the MT signature is clearly identifiable.

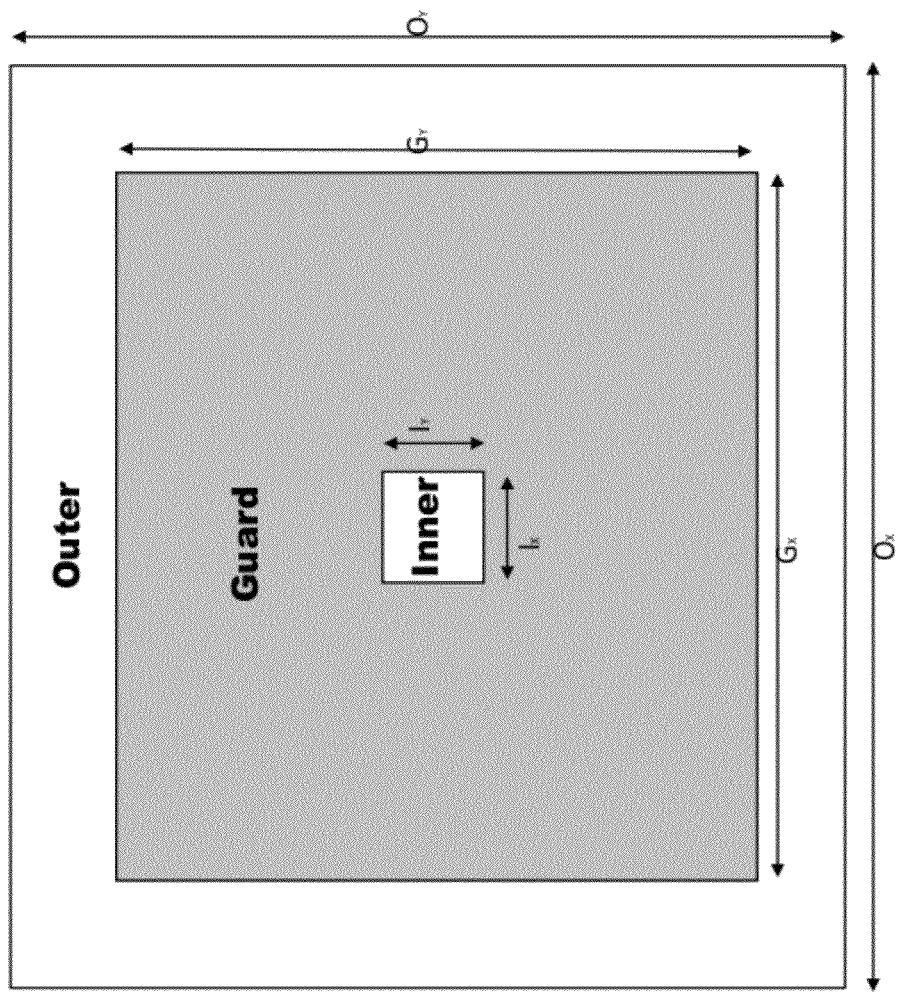
Figure 6 - Example CFAR window, comprising an inner, guard, and outer window.

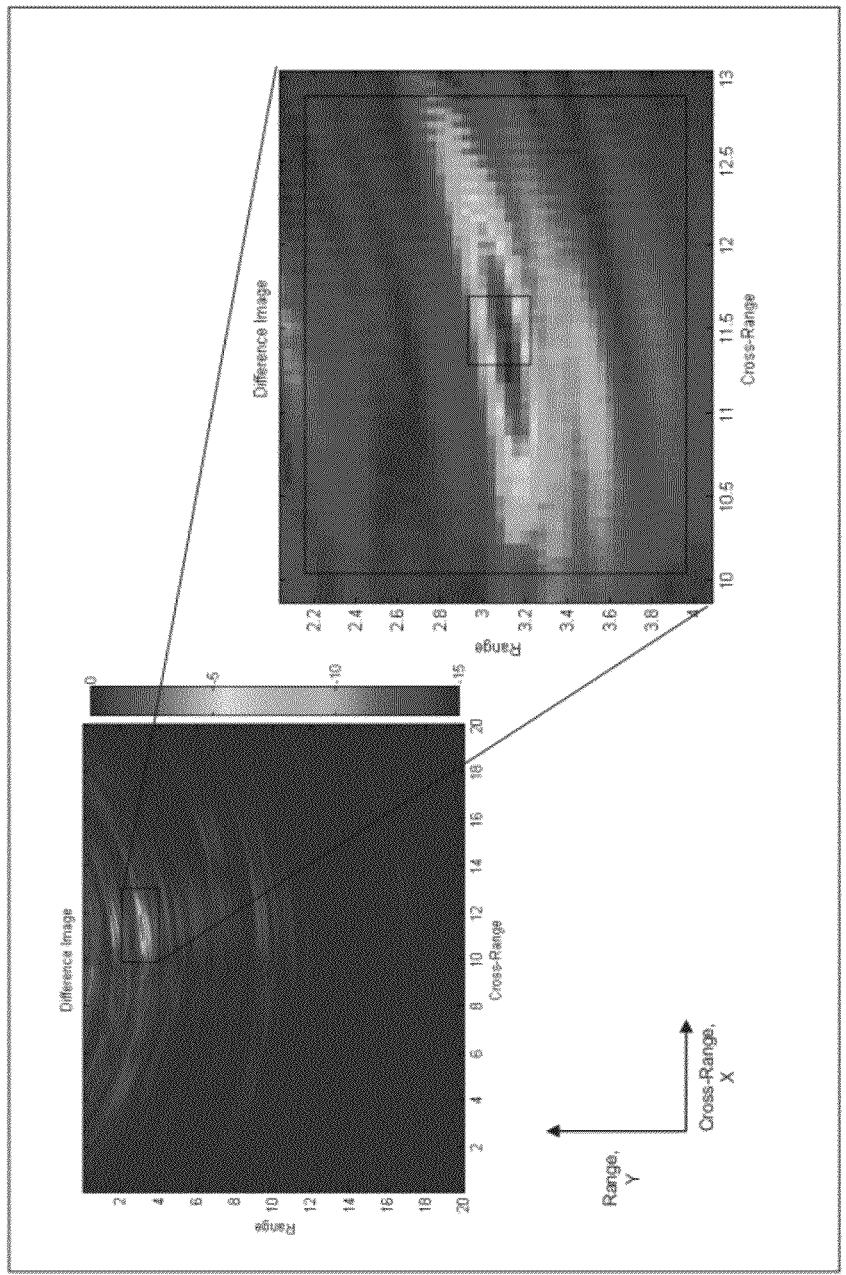
FIG. 7 – CFAR window placed over the MT signature.
(Inner window is overlaid on the MT signature.)

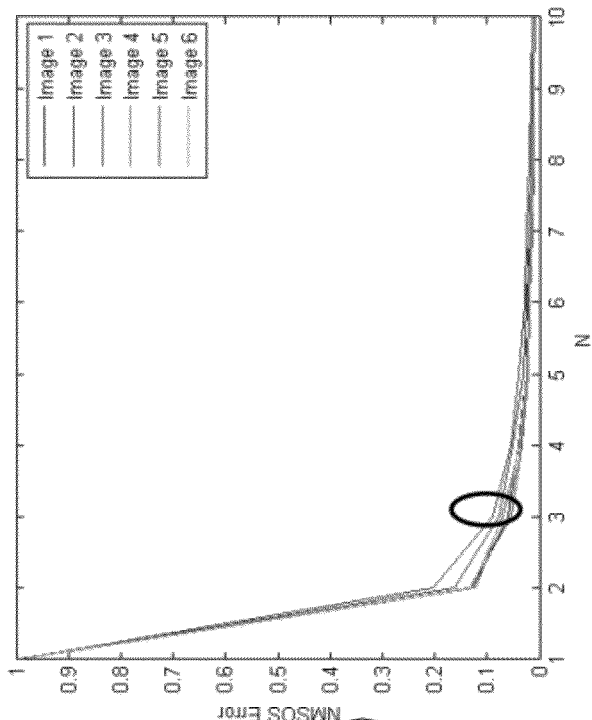
FIG. 8B Knee-Point Algorithm
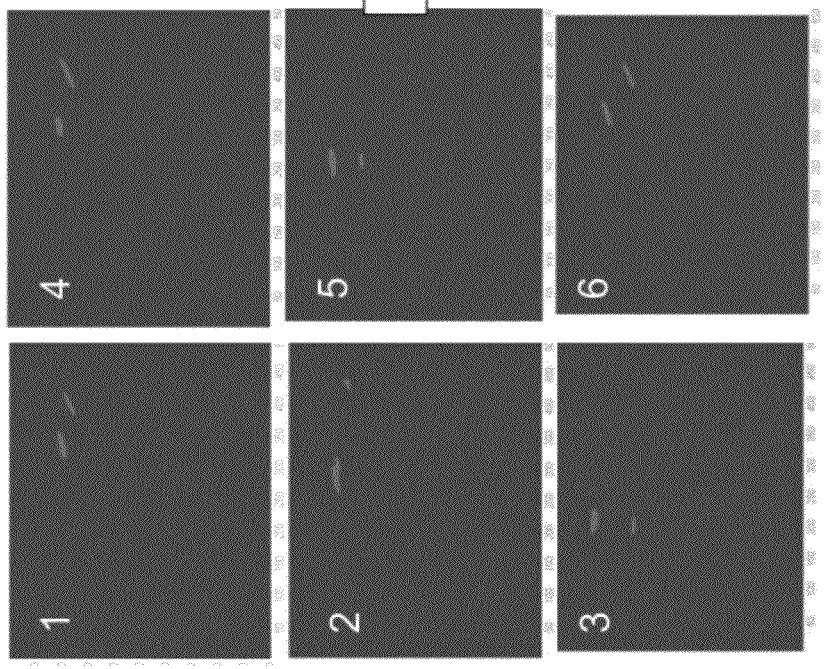
FIG. 8A  6 ATR images –
2 clusters present  per ATR image
Each "Error Line" corresponds to 1 image

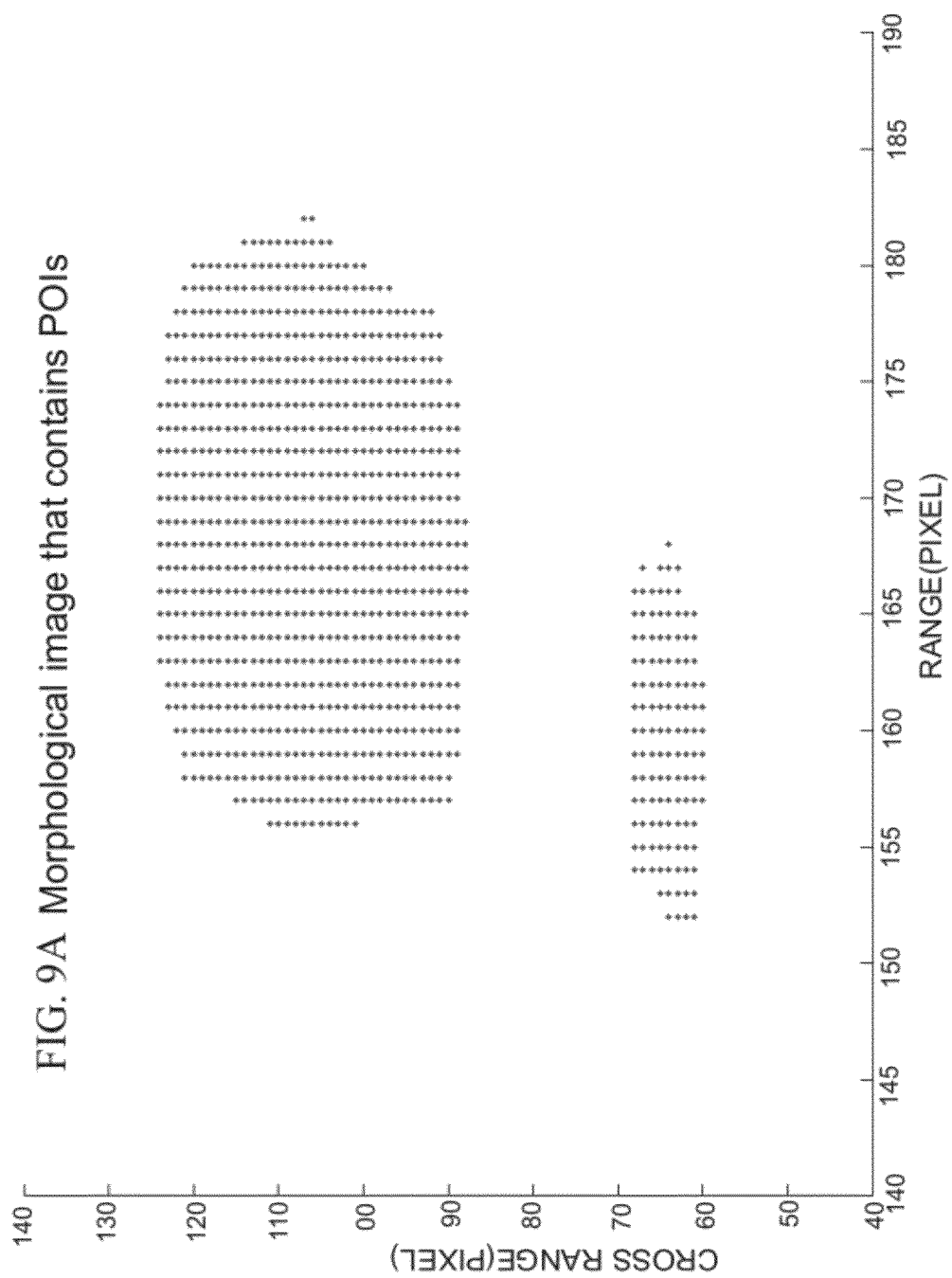

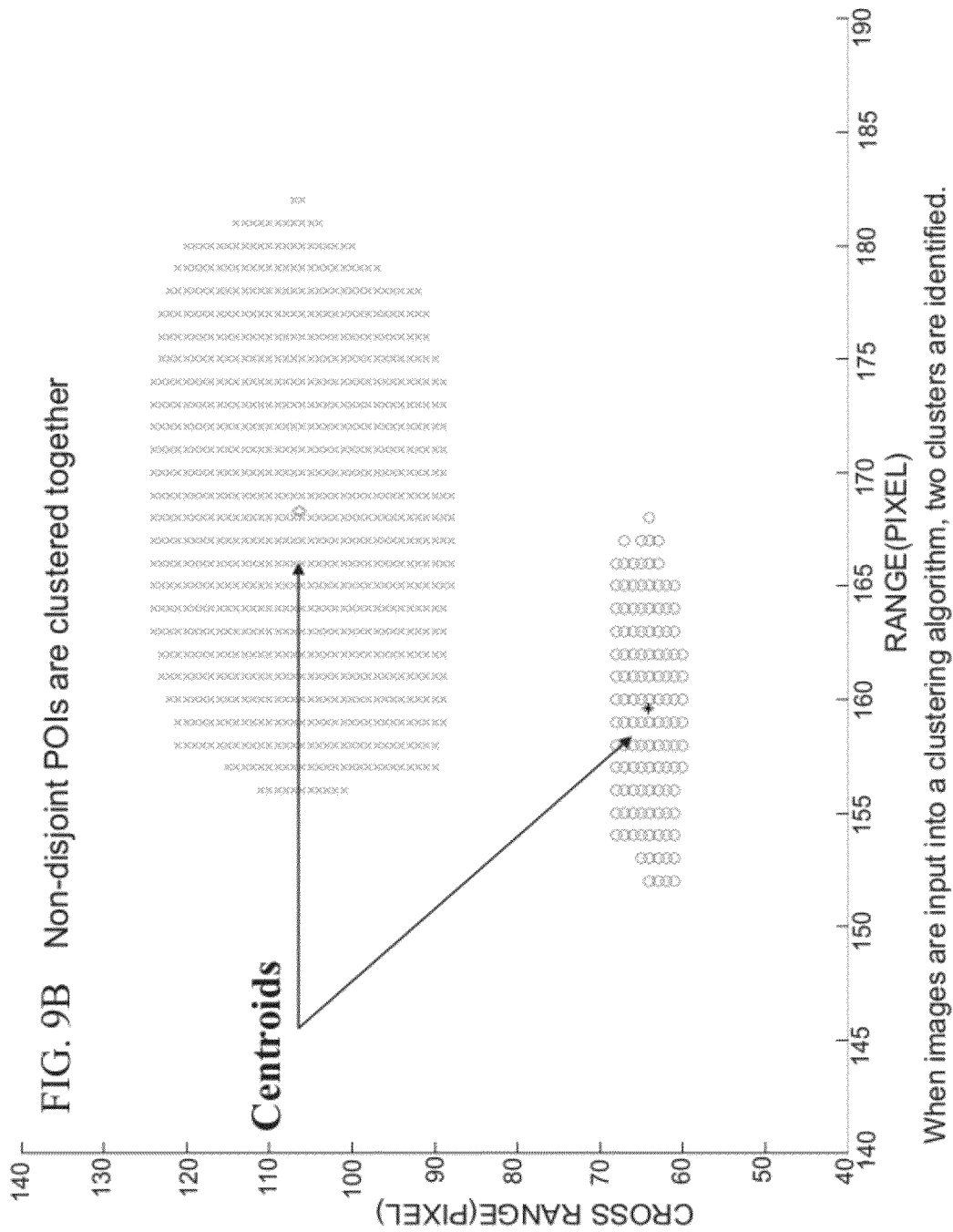
FIG. 9B Non-disjoint POIs are clustered together
When images are input into a clustering algorithm, two clusters are identified.

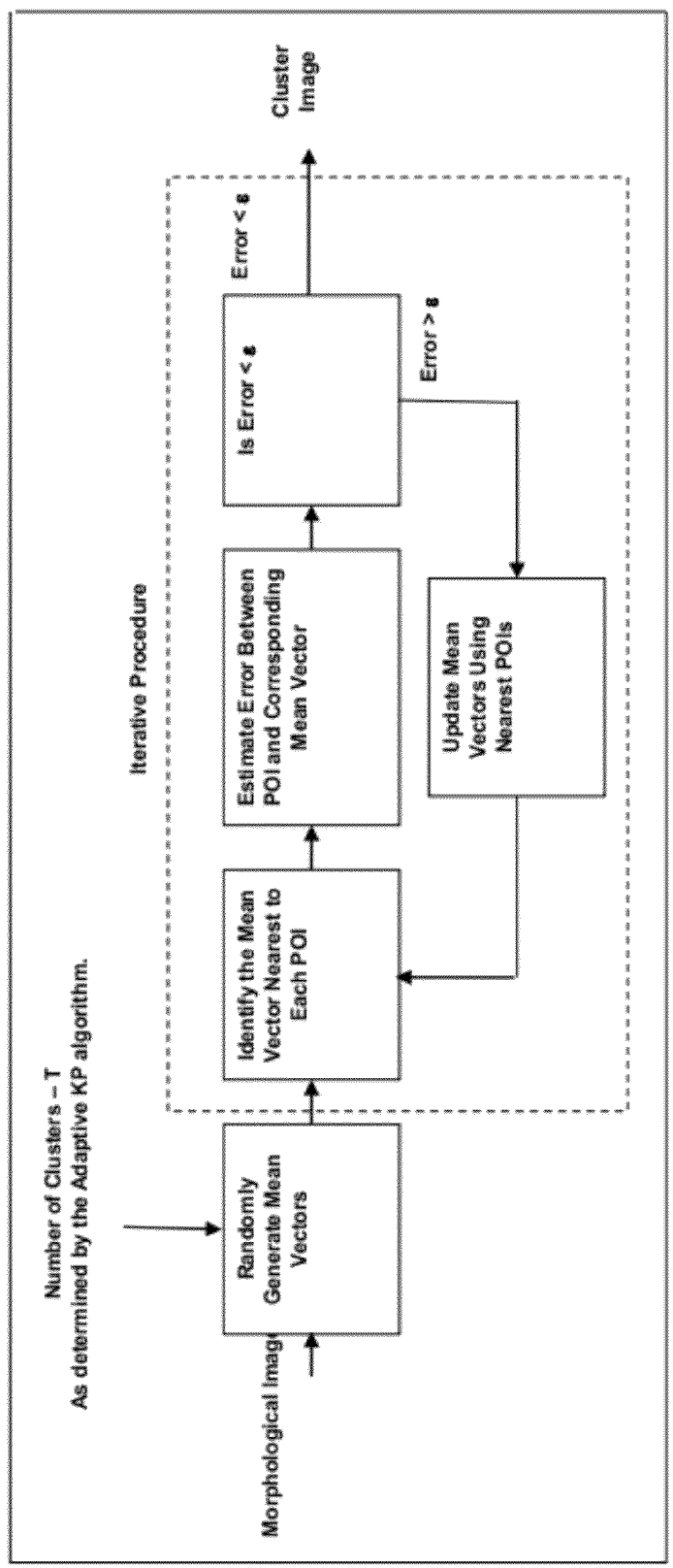
Figure 10- The k-Means algorithm.

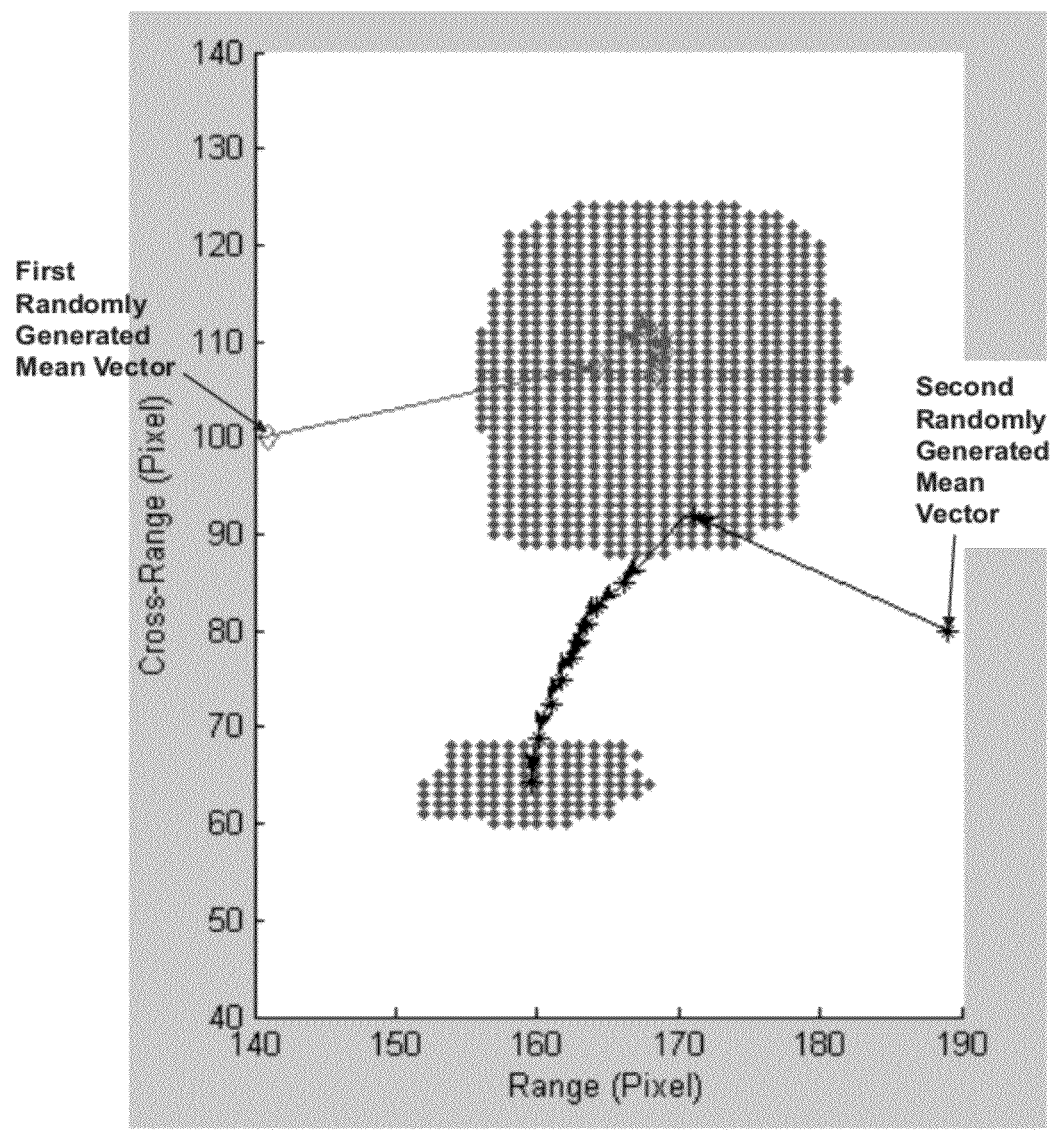
FIG. 11- k-Means algorithm iteration example for T = 2

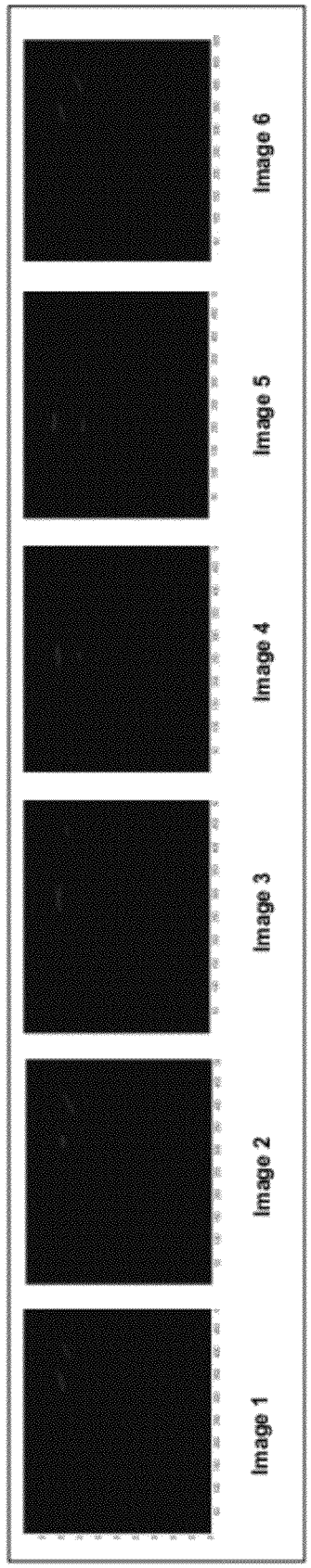
Figure 12- Images with POIs present. Through a visual inspection of the images, it would appear that two clusters are present (T=2).

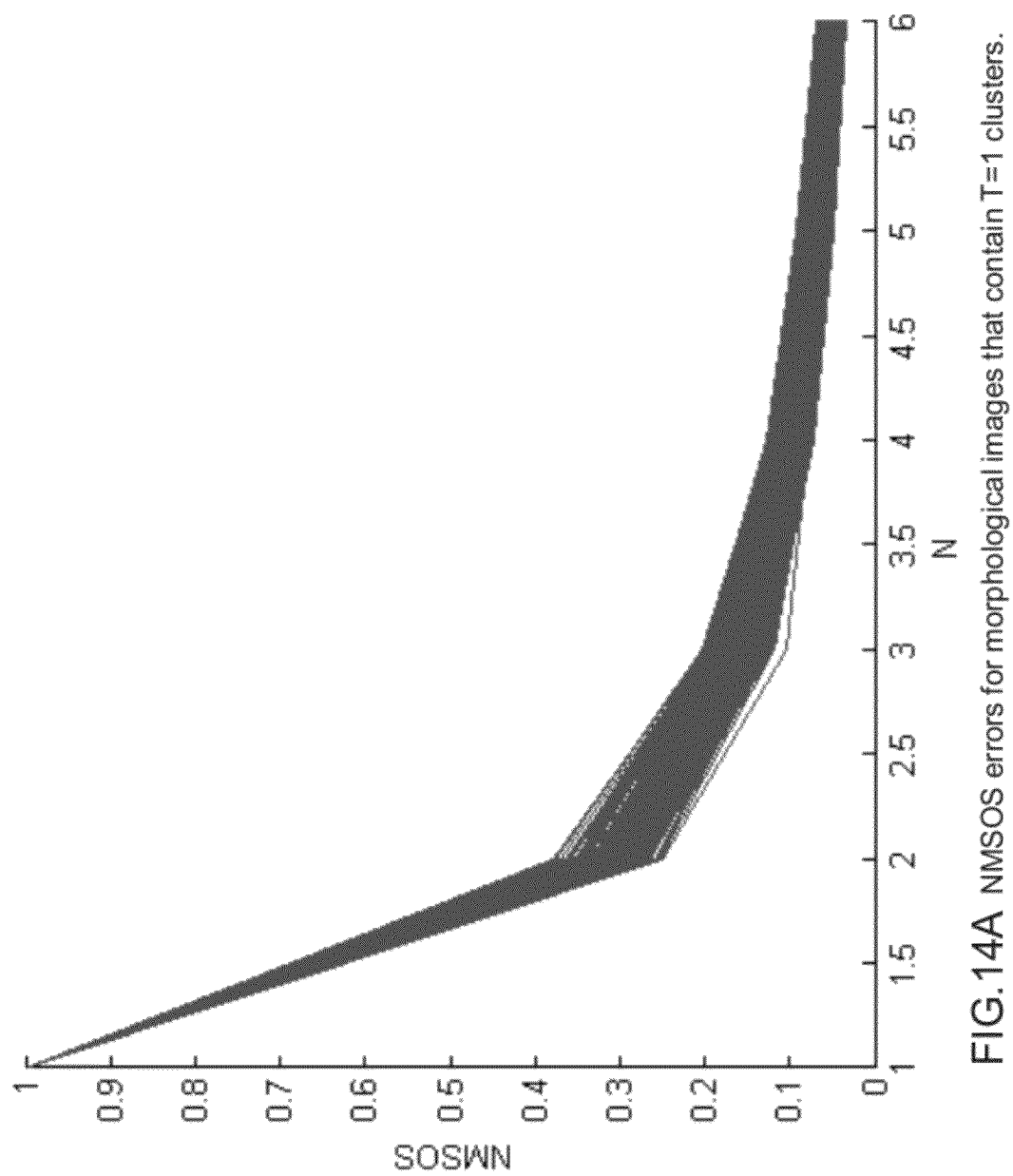
FIG.14A NMSOS errors for morphological images that contain T=1 clusters.

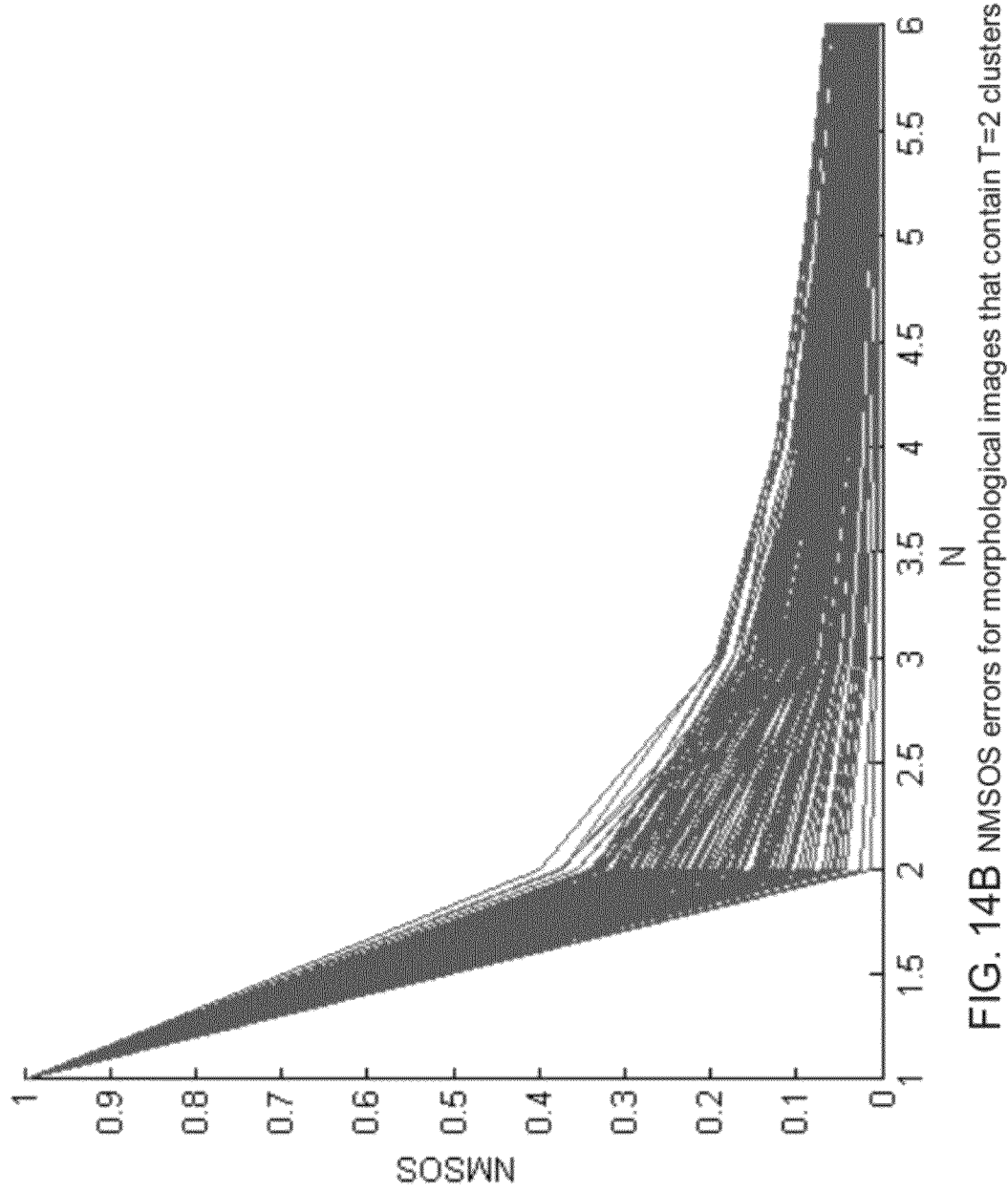
FIG. 14B NMSOS errors for morphological images that contain T=2 clusters.

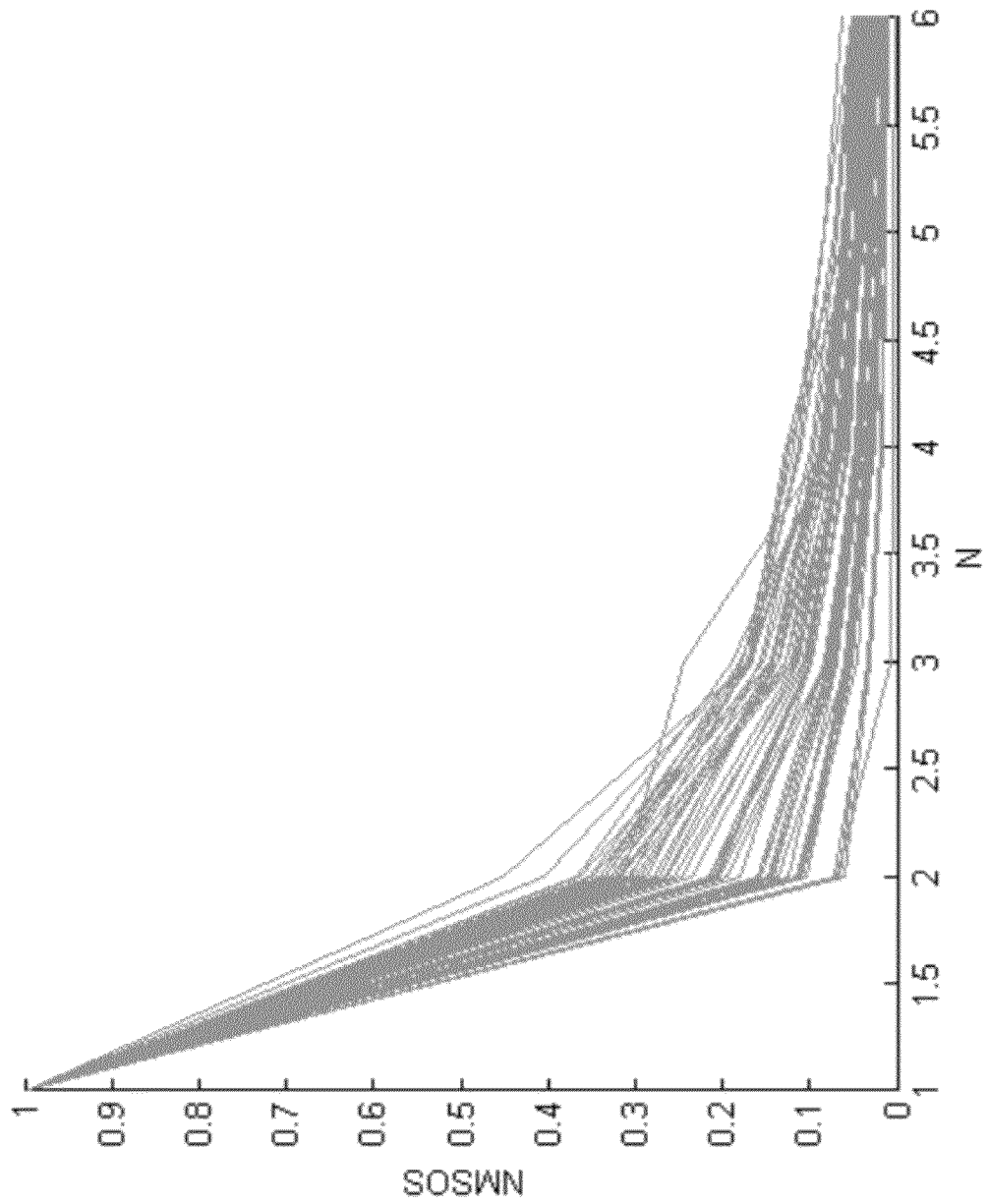
FIG. 14C NMSOS errors for morphological images that contain T=3 clusters.

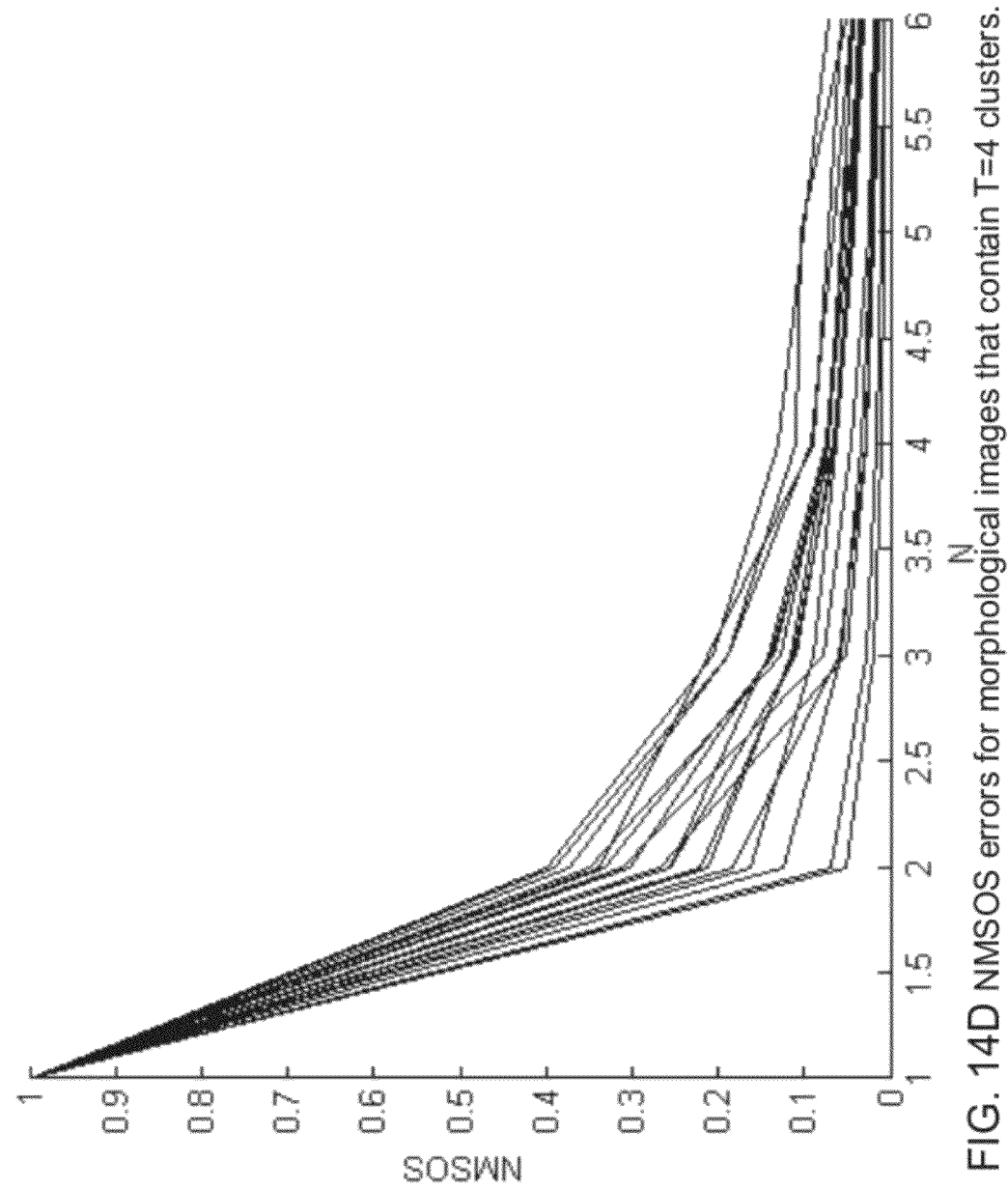
FIG. 14D NMSOS errors for morphological images that contain T=4 clusters.

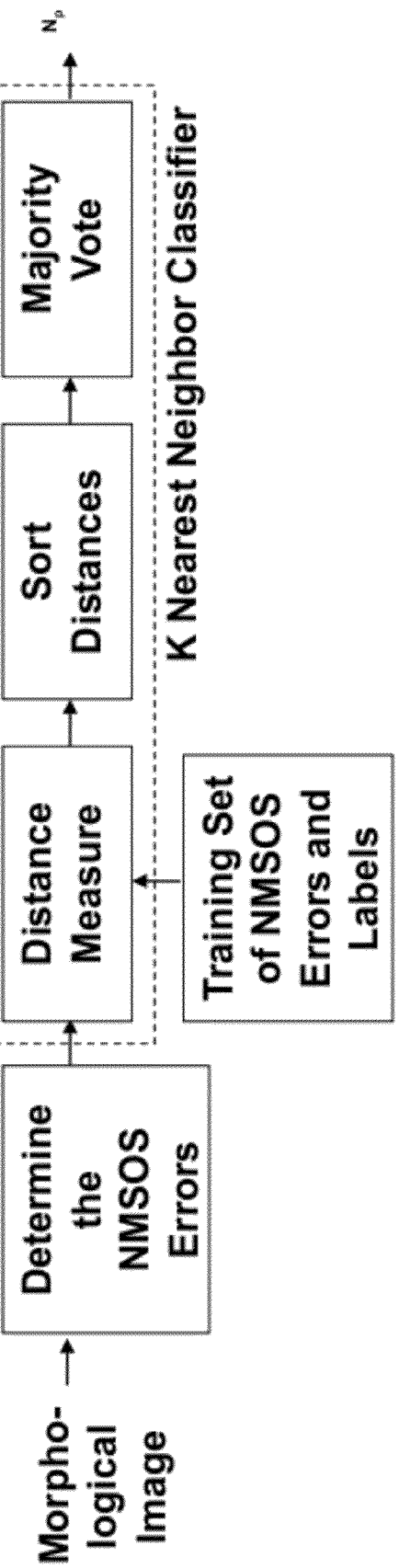
Figure 15 Block diagram of the adaptive KP algorithm.

SYSTEM AND METHOD FOR MOVING TARGET DETECTION

STATEMENT OF GOVERNMENT INTEREST

The embodiments herein may be manufactured, used, and/or licensed by or for the United States Government without the payment of royalties thereon.

TECHNICAL FIELD

The embodiments herein generally relate to detection, and more particularly, to detection of moving targets.

BACKGROUND OF THE INVENTION

Security and military forces operating in urban environments need the capability to detect slow moving personnel inside buildings. To identify moving personnel inside buildings, a time-domain approach may be used that uses a low-frequency, ultrawideband (UWB) radar. A low-frequency, UWB radar is desired since the low-frequency transmit pulse is capable of penetrating through the wall (1) and the UWB corresponds to a high range resolution that gives the capability to better locate the moving target (MT). The publication entitled "An Analysis of Clustering Tools for Moving Target Indication," by Anthony Martone, Roberto Innocenti, and Kenneth Ranney, Sensors and Electron Devices Directorate, Army Research Laboratory, Adelphi, Md., ARL-TR-5037, November 2009 (hereinafter ARL Technical Report 5037), hereby incorporated by reference, discloses a description of a moving target indication (MTI) processing approach to detect and track slow-moving targets inside buildings, which successfully detected moving targets (MTs) from data collected by a low-frequency, ultrawideband radar. MTI processing algorithms include change detection (CD), used to identify the MT signature; automatic target detection (ATD), used to eliminate imaging artifacts and potential false alarms due to target multi-bounce effects; clustering, used to identify a centroid for each cluster in the ATD output images; and tracking, used to establish a trajectory of the MT. These algorithms can be implemented in a real-time or near-real-time system; however, a person-in-the-loop is needed to select input parameters for the clustering algorithm. Specifically, the number of clusters to input into the cluster algorithm is unknown and requires manual selection. As reported in ARL Technical Report 5037 (page 1), the algorithms in the MTI processing formulation can be implemented in a real-time or near real-time system; however, a person-in-the-loop is needed to select input parameters for the k-Means clustering algorithm. Specifically, the number of clusters input into the k-Means routine is unknown and requires manual selection. In the ARL Technical Report 5037, two techniques are investigated that automatically determine the number of clusters: the knee-point (KP) algorithm and the recursive pixel finding (RPF) algorithm. The KP algorithm is a well-known heuristic approach for determining the number of clusters. The RPF algorithm is analogous to the image processing, pixel labeling procedure. Both routines processed data collected by low-frequency, ultrawideband radar.

In research reported in Martone, A.; et al., "Through the Wall Detection of Slow Moving Personnel," Proceedings of the SPIE Conference on Radar Sensor Technology XIII, vol. 7308, Orlando, Fl, April 2009, and Martone, A. et al., "Moving Target Indication for Transparent Urban Structures," ARL-TN-4809, U.S. Army Research Laboratory: Adelphi, Md., May 2009, the effectiveness of time-domain, moving target indication (MTI) approach was reported for detecting moving personnel inside wood and cinderblock structures, moving personnel walking in nonlinear trajectories, and multiple moving personnel walking in linear trajectories.

A time-domain approach to MTI was considered as an alternative to a frequency-domain approach, i.e., Doppler processing, since a very small Doppler shift in backscattered frequency is generated due to (1) the slow motion of the mover and (2) the low frequency needed to penetrate through the wall. The reported time-domain processing algorithms are based on the change detection (CD) paradigm, which is inherently similar to clutter cancellation. In the CD paradigm, the Synchronous Impulse Reconstructive (SIRE) radar remains stationary and generates a set of images for a region of interest (ROI). Each image in the set is formed every two-thirds of a second. The stationary objects in the building remain in the same location in each image; however, moving personnel will be at different locations. The moving personnel can be detected by subtracting adjacent images in the set, thereby eliminating the stationary objects and identifying the MT signature. Additional processing is needed to enhance the MT signature and includes a constant false alarm rate (CFAR) algorithm, morphological processing, k-Means clustering, and a tracking algorithm. CFAR and morphological processing are approaches used to eliminate imaging artifacts and potential false alarms due to target multi-bounce effects. The k-Means clustering algorithm is used to identify centroids for given input clusters, where the clusters are produced by the CFAR and morphological processing algorithms. The tracker is used to establish a trajectory of the MT based on the input centroids.

By way of background, Synchronous Impulse Reconstruction (SIRE) Radar is a low-frequency, ultra-wideband (UWB) radar having a frequency range of 300 MHz~3 GHz. An example of SIRE system is illustrated in FIG. 1, showing 2 transmitters and 16 receivers in an antenna array 2 m wide having an average power of 5 mW with a downrange swath is 10-meters and a downrange resolution is 0.056 meters.

SUMMARY OF THE INVENTION

A preferred embodiment of the present invention comprises a cluster prediction algorithm for a system to automatically detect and track moving personnel inside buildings. The novel cluster prediction algorithm, inter alia, 1) automatically determines the number of clusters in an image (where each cluster corresponds to a potential moving target), 2) reduces false alarms, and 3) automates the entire moving target indication (MTI) system. This fully automated MTI system can be utilized to detect and track hostile personnel, enemy snipers, or hostages inside buildings. The MTI system could also be used for commercial applications that include: 1) law enforcement, 2) search and rescue, 3) building surveillance, 4) vehicle tracking on highways or in remote locations. The MTI system effectively combines several algorithms in a novel way to image slow and fast moving personnel from 6 m to 30 m inside building structures. The MTI system has successfully demonstrated detection capabilities of personnel walking inside wood and cinderblock buildings.

The moving target indication (MTI) system is comprised of two main components. The first component detects potential moving targets by generating a time series of binary images that contain clusters. The second component of the MTI system tracks the centroid of each cluster thereby indicating any moving target in the building. Both components have been studied individually in past research, but could not be combined since the second component requires manual input.

Specifically, the number of clusters in the binary images (output of the first component) is unknown and must be manually input into the second component of the system.

As reported in A. Martone, et al., "Clustering Analysis of Moving Target Signatures," Proceedings of the SPIE Conference on Radar Sensor Technologies XIV, Orlando, Fla., April 2010 (hereby incorporated by reference) a cluster prediction algorithm has been developed. The cluster prediction algorithm i) automatically determines the number of clusters present in the binary images, ii) reduces false alarms in the binary images, iii) combines the first and second components of the MTI system thereby automating the entire MTI system. The cluster prediction algorithm is a novel, necessary, and unique contribution to the MTI system.

A preferred method of detecting moving targets comprises transmitting electromagnetic waves rays from a plurality of transmitters at sequential; receiving reflected waves into a plurality of receivers after each transmission; the compilation of the reflected waves from the plurality of receivers for each transmission representing a data frame; forming a signal that monitors changes between the two sets of frames; at least one processor operating to process and compare frames; forming a difference image using a back-projection algorithm; scanning the difference image using a constant false alarm rate (CFAR) window; the CFAR window scanning the entire difference image and identifying a list of points of interest and eliminating the sidelobe artifacts present in the difference image thereby creating CFAR images; processing the CFAR images using morphological processing to create a morphological image; determining the number of clusters present in the morphological image; using K-means clustering to indicate the centroid of each cluster; and tracking using a Kalman filter.

A preferred embodiment system for detecting moving targets comprises a plurality of M transmitters, a plurality of receivers, and at least one memory, the transmitters operating in sequence to transmit electromagnetic waves rays sequentially; the receivers receiving reflected waves after each transmission; the compilation of the reflected waves from the plurality of receivers for each transmission representing a data frame; at least one processor operating to perform the steps of: forming a signal that monitors changes between the two sets of frames; at least one processor operating to process and compare frames; forming a difference image using a back-projection algorithm; scanning the difference image using a constant false alarm rate (CFAR) window; the CFAR window scanning the entire difference image and identifying a list of points of interest and eliminating the sidelobe artifacts present in the difference image thereby creating CFAR images; processing the CFAR images using morphological processing to create a morphological image; determining the number of clusters present in the morphological image; using K-means clustering to indicate the centroid of each cluster; and tracking using a Kalman filter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 8-19 the colors represent a decibel range which ranges from red to blue, red being the strongest signal and blue being the weakest.

Figure 13:
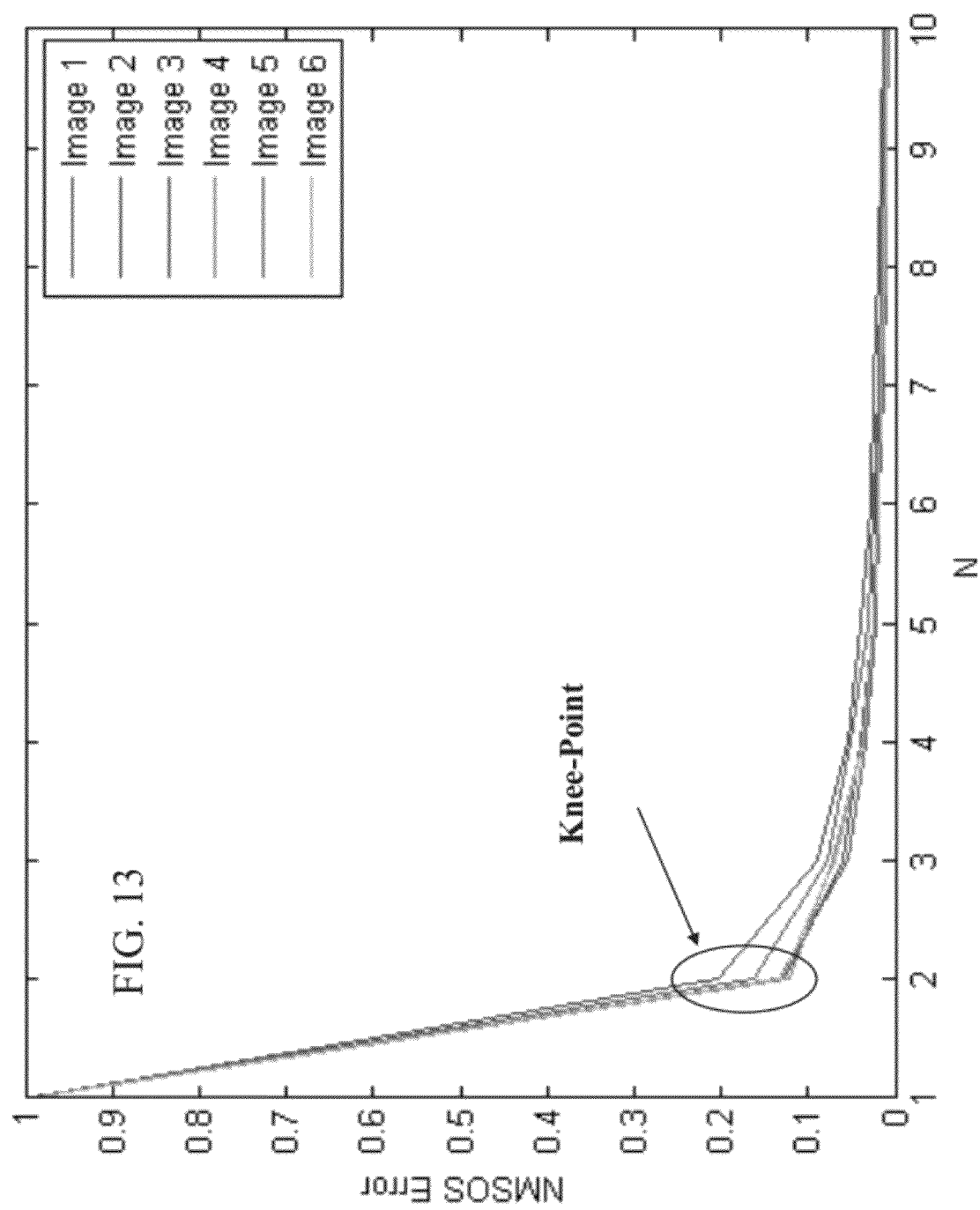

The embodiments herein will be better understood from the following detailed description with reference to the drawings, in which:

FIG. 1 illustrates a schematic diagram of a vehicle having a synchronous Impulse Reconstruction (SIRE) Radar mounted thereon.

FIG. 2 is a block diagram showing a moving target indication system for data collected by a low-frequency UWB radar with correlated illustrations.

FIG. 3 is a block diagram of a is a block diagram showing a moving target indication system for data collected by a low-frequency UWB radar including cluster prediction.

FIG. 4 illustrates two SAR images (a and b) of a target area with a moving target present; the location of the mover is unknown FIG. 5 is an illustration of a difference image generated by applying change detection to the SAR images of FIG. 4, wherein the moving target signature is identifiable.

FIG. 6 schematically illustrates an example of a CFAR window comprising an inner, guard and outer window.

FIG. 7 is a schematic illustration of a CFAR window placed over the MT signature, where the inner window is overlaid on the MT signature and the outer window covers the background of the local area. The inner window contains pixels with higher energy compared with the pixels contained in the outer window.

FIG. 8A is an illustration comprising 6 ATR images with 2 clusters present per ATR image and wherein each "Error Line" corresponds to 1 image;

FIG. 8B is a graphical depiction of a knee point algorithm based upon FIG. 8A.

FIG. 9A is a schematic illustration revealing themorphological image that contains points of interest (POIs). When these images are input into a clustering algorithm, two clusters are identified; the clusters and corresponding centroids are shown.

FIG. 9B is an illustration based upon FIG. 9A when these images are input into a clustering algorithm, two clusters are identified; the clusters and corresponding centroids are shown.

FIG. 10 is block diagram of the k-Means algorithm.

FIG. 11 is a schematic illustration of a k-Means algorithm iteration example for T=2: the red line indicates progression of the first mean vector and the black line indicates progression of the second mean vector; multiple iterations are needed to minimize the error between the POIs and nearest mean vectors.

FIG. 12 is a schematic illustration of images with points of interest present, whereby through a visual inspection of the images, it would appear that two clusters are present (T=2).

FIG. 13 is a schematic graphical illustration showing the knee point for the six images of FIG. 12.

FIG. 14A is a schematic illustration of plots of the NMSOS errors for morphological images that contain T=1 cluster.

FIG. 14B is a schematic illustration of plots of the NMSOS errors for morphological images that contain T=2 clusters.

FIG. 14C is a schematic illustration of plots of the NMSOS errors for morphological images that contain T=3 clusters.

FIG. 14D is a schematic illustration of plots of the NMSOS errors for morphological images that contain T=4 clusters.

FIG. 15 is a schematic block diagram of the adaptive Knee point (KP) algorithm.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The preferred embodiment moving target indication (MTI) system is comprised of two main components. The first component detects potential moving targets by generating a time series of binary images that contain clusters. The second component of the MTI system tracks the centroid of each cluster thereby indicating any moving target in the building. Both components have been studied individually in past research reported in A. Martone, et al., "Automatic Through the Wall Detection of Moving Targets using Low-Frequency Ultra-Wideband Radar," Proceedings of the IEEE international radar conference, Washington, D.C., May 2010, A. Martone, et al., "An Analysis of Clustering Tools for Moving Target Indication; ARL-TN-5037; U.S. Army Research Laboratory: Adelphi, Md., November 2009, A. Martone, et al., "Through the wall detection of slow moving personnel," Proceedings of the SPIE conference on Radar Sensor Technology XIII, vol. 7308, Orlando, Fl, April 2009, and A. Martone, et al., "Moving Target Indication for Transparent Urban Structures," ARL-TN-4809; U.S. Army Research Laboratory, Adelphi, Md., May 2009, all of which are hereby incorporated by reference. However, the individual components could not be combined since the second component requires manual input. Specifically, the number of clusters in the binary images (output of the first component) is unknown and must be manually input into the second component of the system.

In recent research reported in A. Martone, K. Ranney, R. Innocenti, "Clustering analysis of moving target signatures," in Proceedings of the SPIE conference on Radar Sensor Technology XIV, Orlando, Fl, April 2010, hereby incorporated by reference, a cluster prediction algorithm has been developed. The cluster prediction algorithm i) automatically determines the number of clusters present in the binary images, ii) reduces false alarms in the binary images, iii) combines the first and second components of the MTI system thereby automating the entire MTI system. The cluster prediction algorithm is a novel, necessary, and unique contribution to the MTI system.

To identify moving personnel inside buildings, a time-domain processing system is utilized that utilizes a low-frequency, ultra-wideband (UWB) radar. A low-frequency, UWB radar is desired since the low-frequency transmit pulse is capable of penetrating the wall, as reported in Farwell, M., et al., "Sense through the wall system development and design considerations," J. of the Franklin Institute September 2008, 345 (6), 570-591, hereby incorporated by reference, and the ultra-wideband corresponds to a high range resolution that gives the capability to better locate the moving target. The time-domain approach to moving target indication (MTI) is utilized as an alternative to a frequency-domain approach, i.e. Doppler processing, since a very small Doppler shift in back-scattered frequency is generated due to: 1) the slow motion of the mover and 2) the low frequency needed to penetrate the wall.

The MTI system is shown in FIG. 3. The MTI processing system consists of the following processing routines: change detection, image formation via a specially adapted version of the back-projection algorithm, constant false alarm rate (CFAR) processing, morphological processing, cluster prediction, k-Means clustering, and tracking via the Kalman filter. Each processing routine is described in detail in the following. As discussed, the cluster prediction algorithm has recently been researched and is a novel contribution to the MTI processing system.

The cluster prediction algorithm i) automatically determines the number of clusters present in the binary images, ii) reduces false alarms in the binary images, iii) combines the detection and tracking components of the MTI system thereby automating the entire system.

Change Detection

The constituent radar in our MTI system remains stationary and measures the energy reflected from an area under surveillance. Downrange profiles are measured and buffered by each receive channel for a single set of transmit pulses. Since the transmitters fire in sequence, M downrange profiles are effectively buffered (one for each transmitter) from each receive channel, and the time required to assemble these profiles represents one frame of data. After buffering the data from one frame, another M downrange profiles are collected from each receive channel for the next frame of data.

Next, the coherent difference between these newly collected profiles is formed and the corresponding buffered profiles are formed to obtain a new data set consisting of modified downrange profiles defined by $$\dot{f}_{i,j,k}(r) = f_{i+1,j,k}(r) f_{i,j,k}(r), i=1,\ldots,N-1, j=1,\ldots,M, \text{ and } k=1,\ldots,N_c. \quad (1)$$

Here r represents the downrange index, i represents the time index, j represents the transmitter index, and k represents the receiver index. Hence, a signal is formed that monitors changes between the two sets of downrange profiles measured at time i and time i+1 using transmitter j and receiver k; hence, the name of the model is a "change detection" (CD) paradigm. The difference signal, $\dot{f}_{i,j,k}(r)$ (corresponding to the derivative in time), is then input to an image formation routine, in this case a time-domain back-projection procedure, resulting in the output difference image, $$I_{diff}(x, y) = \sum_{k=1}^{N_c} \sum_{j=1}^{M} \sum_{i=1}^{N-1} g(i, j, k) \dot{f}_{i,j,k}(r_{i,j,k}), \quad (2)$$

where g(i,j,k) is a scaling function. To illustrate the effectiveness of the CD approach, the SAR images in FIG. 4, parts A and B are considered. The SAR images are focused on the same target area at different moments in time without forming the difference, and one person is moving within the target area. SAR Image 1, $I_1(x,y)$, was focused by a back-projection procedure using downrange profiles $\{f_{1,1,1}(r), \ldots f_{1,1,16}(r)\}$. SAR Image 2, $I_2(x,y)$, was focused by a back-projection procedure using downrange profiles $\{f_{2,1,1}(r), \ldots f_{2,1,16}(r)\}$. As is evident, the SAR images contain several artifacts making it difficult to identify the moving target. The moving target is located by applying change detection. The resulting difference image is shown in FIG. 5. It is clear from the difference image that most of the artifacts due to stationary clutter have been eliminated and the resulting MT signature is identified.

Constant False Alarm Rate (CFAR) Approach

Interpretation of the resulting MT signature is still challenging after change detection. For example, change detection cannot automatically identify the MT signature located in the difference image and the MT signature can only be identified through visual inspection of a sequence of difference images. Therefore, it is not possible to implement additional signal processing techniques like classification using a single difference image. Another challenge with change detection is that sidelobe artifacts are produced in the difference image, which confuse the true moving target location.

A way to improve user interpretation of the resulting difference image is to apply the CFAR algorithm. CFAR is a well-established approach to eliminating potential false alarms. Typically, the algorithm performs a test of local contrast that is designed to achieve a constant false alarm rate as reported in Gandhi, P. P. & Kassam, S. A., "Analysis of CFAR Processors in Homogeneous Background," *IEEE Transactions on Aerospace and Electronic Systems* July 1988, 24 (4), 427-445, hereby incorporated by reference. For a given difference image $I_{diff}(x,y)$, a CFAR window is used to scan the difference image and test for the MT signature. An example of a CFAR window is shown in FIG. 6, where $I_X$ and $I_Y$ are the inner windows' cross-range and range dimensions, respectively; $G_X$ and $G_Y$ are the guard windows' cross-range and range dimensions; and $O_X$ and $O_Y$ are the outer windows' cross-range and range dimensions. The inner window dimensions are designed so that it is overlaid on the MT signature. When the inner window is overlaid on the MT signature, the outer window dimensions are designed to be superimposed on the local background. The guard window is used as a buffer between the inner and outer windows and ensures that large pixel values due to target sidelobes are not captured by the outer window. For example, consider the window that is placed in the difference image shown in FIG. 7. As is illustrated in the figure, the inner window is overlaid on the MT signature pixels and the outer window is overlaid on the local background pixels.

Based on observations and analysis of the MT signatures, the following dimensions for the CFAR window were selected: $I_X=7$, $I_Y=9$, $G_X=23$, $G_Y=25$, $O_X=27$, $O_Y=29$ (note that a 1×1 pixel equals 0.04×0.04 meters). It is of interest to note that the dimensions of the inner window constitute a small rectangular shape, which is different from the elliptical patterns of the MT signatures. The rectangular shape is chosen since it is small enough to fit over the MT signatures. The small rectangular window is used as an alternative to an elliptical window since the size and shape of the pattern of the moving target changes depending on the range and cross-range of the mover's position.

The CFAR window is placed in the difference image of size (500,500) and moved pixel by pixel over the entire difference image. Let the center of the CFAR window be positioned at coordinates (X, Y) in the difference image, where $X \in \{\lceil I_X/2 \rceil, \ldots (500-\lfloor O_X/2 \rfloor)\}$ and $Y \in \{\lceil O_Y/2 \rceil, \ldots (500-\lfloor O_Y/2 \rfloor)\}$. The notation $\lfloor x \rfloor$ denotes the largest integer less than x for x>0 (i.e., floor), and $\lceil x \rceil$ denotes the smallest integer greater than x for x>0 (i.e., ceiling). The CFAR algorithm indicates an MT signature if the sum of the energy in the inner window is larger than the sum of the energy in the outer window. This is shown in FIG. 7, where the energy of the pixels in the inner window is larger then the energy of the pixels in the outer window. The inner window to outer window energy ratio is defined as $$R = \frac{\mu_i}{\mu_o}, \quad (3)$$

where $$\mu_i \sum_k \sum_l [\Phi(P_{(l,k)})]^2 \quad (4)$$

is the sum of the energy in the inner window, $k=[Y-\lfloor I_Y/2 \rfloor, \ldots Y+\lfloor I_Y/2 \rfloor]$, $l=[X-\lfloor I_X/2 \rfloor, \ldots X+\lfloor I_X/2 \rfloor]$, and $P_{(l,k)}$ is the magnitude of the pixel at position (l,k). Define $$\Phi(P_{(l,k)}) = \begin{cases} P_{(l,k)}, & P_{(l,k)} > \eta \\ \eta, & P_{(l,k)} \le \eta, \end{cases} \quad (5)$$

where $\eta = \max(I_{diff}(x,y))/2$ and $\max(I_{diff}(x,y))$ is the maximum pixel magnitude in the difference image. The function $\Phi(P_{(l,k)})$ is used to adjust the image background and require that the magnitude of each pixel is above the threshold defined by $\eta$, which is done to prevent errors due to division by very small numbers. Division by very small numbers artificially inflates the ratio defined by equation 3 and causes false positives. The threshold $\eta$ was chosen based on the observations of the sidelobes corresponding to the MT signature, which are typically less than $\max(I_{diff}(x,y))/2$ in magnitude. This choice of $\eta$ eliminates the sidelobes by blending them into the background of the difference image.

The sum of the energy in the outer window is defined as $$\mu_o = E_W - E_{I+G}, \quad (6)$$

where $$E_W = \sum_m \sum_n [\Phi(P_{(n,m)})]^2$$

is the sum of the energy in the entire CFAR window, $m=[Y-\lfloor O_Y/2 \rfloor, \ldots Y+\lfloor O_Y/2 \rfloor]$, $n=[X-\lfloor O_X/2 \rfloor, \ldots X+\lfloor O_X/2 \rfloor]$, and where $E_{I+G}$ is defined as the sum of the energy in the guard and inner windows such that $$E_{I+G} = \sum_q \sum_r [\Phi(P_{(r,q)})]^2 \quad (7)$$

where $q=[Y-\lfloor G_Y/2 \rfloor, \ldots Y+\lfloor G_Y/2 \rfloor]$ and $r=[X-\lfloor G_X/2 \rfloor, \ldots X+\lfloor G_X/2 \rfloor]$. A CFAR test is defined as $$\Psi = \begin{cases} 1 & R > 2 \\ 0 & \text{else}, \end{cases} \quad (8)$$

which requires that the sum of the energy in the inner window is more than twice the sum of the energy in the outer window. If $\Psi=1$, then the center pixel (at coordinates (X,Y)) is a POI corresponding to an assumed moving target. The CFAR window scans the entire difference image and a list of POIs are identified. For example, consider the difference image and CFAR image of FIGS. 8A and 8B. The difference image is input into the CFAR algorithm and the CFAR image is output. The red cluster in the CFAR image corresponds to a group of POIs. This example illustrates that the CFAR algorithm identifies the MT signature and eliminates the sidelobe artifacts present in the difference image.

Next, morphological processing is applied to further refine the number of clusters present in the CFAR images. The morphological processing considered implements a dilation and erosion procedure. Dilation is used to grow the POI clusters and erosion is used to shrink the POI clusters. The dilation process is designed to connect clusters in close proximity by dilating all pixels in each CFAR image. For dilation define a 17×17 dilation window $\chi_d$ is defined as:

$$[\chi_d]_{17,17} = \begin{bmatrix} 1 & \cdots & 1 \\ \vdots & \ddots & \vdots \\ 1 & \cdots & 1 \end{bmatrix}$$

The 17×17 dilation window size was chosen to connect clusters separated by a distance of 0.68 m or less (this distance was chosen based on observations of the clusters in the CFAR images). Similar to CFAR, a dilation test statistic is defined:

$$\Psi_d = \begin{cases} 1, & \sum_{\alpha=1}^{17} \sum_{\beta=1}^{17} \chi_d(\alpha, \beta) \cdot C_i(j+\alpha-1, k+\beta-1) > 0 \\ 0, & \text{else} \end{cases} \quad (9)$$

for all j=1, . . . 484 and k=1, . . . 484. When the dilation window scans the CFAR image, an 8 pixel buffer exists along the edge of the CFAR image (i.e. not enough samples exist at the edges of the image). There exist i=1, . . . N−1 dilation images; one for each CFAR image. If $\Psi$=1 for a given i, j, k then a dilation occurs and $D_i$(j+8, k+8)=1, where $D_i$(x,y) is a dilation image of size (500×500). If $\Psi_d$=0, then $D_i$(j+8, k+8)=0, and no dilation occurs.

Next, an erosion procedure is applied to reduce the size of the clusters in the dilation image back to their original size in the CFAR image. Any clusters joined using the dilation process will remain joined after the erosion process. For erosion, a 17×17 erosion window $\chi_e$ is defined as:

$$[\chi_e]_{17,17} = \begin{bmatrix} 0 & \cdots & 0 & 1 & 0 & \cdots & 0 \\ \vdots & \ddots & \vdots & \vdots & \vdots & \ddots & \vdots \\ 0 & \cdots & 0 & \vdots & 0 & \cdots & 0 \\ 1 & \cdots & \cdots & 1 & \cdots & \cdots & 1 \\ 0 & \cdots & 0 & \vdots & 0 & \cdots & 0 \\ \vdots & \ddots & \vdots & \vdots & \vdots & \ddots & \vdots \\ 0 & \cdots & 0 & 1 & 0 & \cdots & 0 \end{bmatrix}$$

Similar to the dilation procedure, the erosion test statistic is defined as $$\Psi_e \begin{cases} 1 & \gamma = \Omega \\ 0 & \text{else} \end{cases} \quad (10)$$

where $$\gamma = \sum_{\alpha=1}^{17} \chi_e(\alpha, 9) \cdot D_i(j+\alpha-1, k+8) + \sum_{\beta=1}^{17} \chi_e(9, \beta) \cdot D_i(j+8, k+\beta-1) \quad (11)$$

and Ω=34 is the erosion threshold, j=1, . . . 484, and k=1, . . . 484. There exist i=1, . . . N−1 erosion images; one for each dilation image. If $\Psi_e$=1 for a given i, j, k, then $E_i$(j+8, k+8)=1, where $E_i$(x,y) is an erosion image of size (500×500). If $\Psi_e$=0, then an erosion occurs and $E_i$(j+8, k+8)=0. The set of erosion images, {$E_1$(x,y) . . . $E_{N-1}$(x,y)}, is referred to as the morphological output images.

Clustering Analysis

The k-Means algorithm is referenced Wilpon, J., et al., "A Modified K-means Clustering Algorithm for Use in Isolated Work Recognition," IEEE Transactions on Acoustics, Speech and Signal Processing vol. 33, no. 3, July 1985, 587-594, hereby incorporated by reference. Note that the k-Means algorithm requires the number of clusters present in the morphological images and is provided by the cluster prediction algorithm described in the section entitled Cluster Prediction Algorithm. A cluster is defined as a group of one or more POIs that are close to one another in the image. The total number of clusters present in the morphological image referred to as T. For example, consider the POIs in FIG. 9A, a morphological image where each POI corresponds to a blue diamond. When these images are input into a clustering algorithm, two clusters are identified; the clusters and corresponding centroids are shown in FIG. 9B. The POIs connected to each other form a cluster as illustrated in FIG. 9B. As is shown, T=2 clusters are present in the morphological image. Once the number of clusters in the image is known, the k-Means algorithm is used to indicate the centroid of each cluster.

The k-Means algorithm identifies the centroids of the POIs by an iterative procedure. This iterative procedure minimizes the square-error between centroid estimates and their corresponding POIs. It should be noted that the clusters identified by the clustering algorithm are not unique and it is possible that the centroid locations differ for different iterations of the clustering algorithm. A block diagram of the k-Means algorithm is shown in FIG. 10.

The input morphological image contains a set of M POI vectors, where each vector is of size two and contains range and cross-range position information. The k-Means algorithm begins by randomly generating T mean vectors and defining each mean vector to be a centroid location. Note that, at this point, T is unknown and must be manually defined. The adaptive KP algorithm can be leveraged to automatically determine T. The next step of the k-Means algorithm determines the mean vector nearest to each POI using the Euclidean distance measure. An error (offset) is then estimated between the mean vector and nearest POIs using the sum of squares (SOS) error criteria as referenced in Duta, R, et al., "Pattern Classification," 2nd ed. John Wiley and Sons Inc.: New York, N.Y., 2001, hereby incorporated by reference. This SOS error criterion is a measure of variance between the POI vectors and the nearest mean vectors and must be minimized. Once minimized, the SOS error indicates the final centroid estimates represented by the mean vectors. For example, consider the morphological image in FIG. 11. In this example, two mean vectors were randomly generated and indicated by the red diamond and black star. As the k-Means algorithm iterates, several centroids are estimated. Each newly generated estimate corresponds to a smaller SOS error.

Illustrated in FIG. 11 is a k-Means algorithm iteration example for T=2. The red line indicates progression of the first mean vector and the black line indicates progression of the second mean vector. Multiple iterations are needed to minimize the error between the POIs and nearest mean vectors.

Tracker Algorithm

The tracker algorithm is intended to reduce the number of false alarms and segregate targets from both clutter and one another as they move inside a building. The centroids generated by the clustering algorithm serve as inputs to the tracker; so it is possible to have multiple tracker inputs even when a single moving target is present. These centroids may indicate the true position of a moving target or false alarms. The tracker estimates the correlation between each centroid and the existing tracks and then associates the existing tracks with the most highly correlated (i.e., most reasonable) centroid. Non-assigned centroids are used to initiate new tracks and outdated tracks are deleted. A Kalman filter determines the present track position and predicts the next measurement.

Cluster Prediction Algorithm—the Adaptive Knee-Point Algorithm

The Knee-Point (KP) algorithm (i.e. non-adaptive) is one approach to automatically determine T for a particular morphological image. The KP algorithm is a heuristic approach used to determine the optimal number of clusters as referenced in Thorndike, R. "Who belongs in the family?" Psychometrika December 1953, 18 (4), 267-276, and Zhao, Q. et al. "Knee Point Detection on Bayesian Information Criteria," Proceedings of the 20th IEEE International Conference on Tools with Artificial Intelligence, vol. 2, November 2008, 431-438, hereby incorporated by reference. The KP algorithm begins by repeating the k-Means algorithm for many different cluster number choices, where the maximum cluster number is denoted by C. This will produce a set of minimized SOS errors $\hat{J}=\{\hat{J}_1, \hat{J}_1, \ldots \hat{J}_C\}$, where $\hat{J}_N$ is the $N^{th}$ minimized SOS error, and $N=1, 2, \ldots C$ denotes the cluster number choice. $\hat{J}$ is normalized by $\max(\hat{J})$ to obtain:

$$\bar{J}=\{\bar{J}_1,\bar{J}_2,\ldots \bar{J}_C\}=\hat{J}/\max(\hat{J}) \quad (12)$$

where $\bar{J}_i$ is the $i^{th}$ normalized minimized SOS (NMSOS) error. A heuristic used to identify the number of clusters searches for a large drop in NMSOS error, i.e., the "knee-point." For example, consider the images shown in FIG. 11. By visual inspection it would appear that two clusters are present in the images (i.e., T=2). The NMSOS errors for each image of FIG. 12 are plotted in FIG. 13, where $N=1, \ldots C$. As is shown in FIG. 14, a large gap exists between $N=1$ and $N=2$, thereby indicating that the predicted number of clusters, $N_p$, is 2. $N_p=2$ correctly corresponds to the true number of clusters, T, in the images. Shown in FIG. 12 are images with POIs present. Through a visual inspection of the images, it would appear that two clusters are present (T=2).

In the previous research article A. Martone, et al., "*An Analysis of Clustering Tools for Moving Target Indication*," ARL-TN-5037; U.S. Army Research Laboratory: Adelphi, MD, November 2009, the KP algorithm was used (without the proposed training adaptation) to identify the number of clusters present in the morphological images. It was determined that the knee-point indicated by the KP algorithm is ambiguous. For example, consider the NMSOS errors illustrated in FIGS. 14A-D, which illustrates plots of the NMSOS errors organized for different values of T. These NMSOS errors were estimated using the KP algorithm on data collected by the SIRE radar. As is shown in FIG. 14B, some NMSOS errors clearly indicate that two clusters are present. However, other NMSOS errors in FIG. 14B resemble those illustrated in FIG. 14A where T=1.

The ambiguity of the NMSOS errors motivates the need to adapt the KP algorithm to include training information. The training information consists of NMSOS errors obtained by the KP-algorithm. In addition, each NMSOS error in the training set contains a label, $\theta \in \{1, \ldots C\}$, indicating T. The training set therefore consists of a set of M training vectors, $[\{J_1,\theta_1\}, \ldots \{J_M,\theta_M\}]$, consisting of the NMSOS errors and their corresponding labels, where $J_i=\{\bar{J}_{i,1}, \ldots \bar{J}_{i,C}\}$ (equation 12) is a set of NMSOS errors. A block diagram of the adaptive KP algorithm is shown in FIG. 15. For a given morphological image with an unknown number of clusters, the NMSOS errors are first determined and denoted as $J_{morph}=\{J_{morph,1}, \ldots J_{morph,C}\}$. The k-Nearest Neighbor (k-NN) classifier then utilizes the training set to automatically determine the number of clusters, i.e. $N_p$, corresponding to the morphological image. The k-NN classifier first estimates the distance between $J_{morph}$ and $[J_1, \ldots J_M]$ based on Euclidean distance. The distance values are denoted as $[\{d_1,\theta_1\}, \ldots \{d_M,\theta_M\}]$, where $$d_i = \sqrt{(\bar{J}_{i,1} - J_{morph})^2 + \ldots + (\bar{J}_{i,C} - J_{morph})^2} \quad (13)$$

The distances are then sorted from smallest to largest to produce $[\{S_1,\theta_1\}, \ldots \{S_M,\theta_M\}]$, where $S_1$ corresponds to the smallest distance, $\theta_1$ corresponds to the label of the smallest distance, $S_M$ corresponds to the largest distance, and $\theta_M$ corresponds to the label of the largest distance. Once sorted, the labels of the K smallest distances, $[\theta_1, \ldots \theta_K]$, are examined based on a majority vote. Define $[K_1, K_2, \ldots K_C]$ as a set corresponding to the number of labels in $[\theta_1, \ldots \theta_K]$ of each class (where a class denotes T). For example, if $[\theta_1=1, \theta_2=1, \theta_3=1, \theta_4=1, \theta_5=2, \theta_6=2, \theta_7=3, \theta_8=3, \theta_9=3]$, where C=3, then $[K_1=4, K_2=2, K_3=3]$. A predicted label can then be determined for $J_{morph}$ as:

$$N_p = \underset{j}{\mathrm{argmax}}[K_j] \quad (14)$$

where $j=\{1, \ldots C\}$. For the example described in the above paragraph, $N_p=1$, meaning that the majority of training NMSOS errors indicate that the NMSOS error of $J_{morph}$ is from class T=1. The results of the research described in A. Martone, et al., "Clustering analysis of moving target signatures," *in Proceedings of the SPIE conference on Radar Sensor Technology XIV*, Orlando, Fl, April 2010, indicate that the adaptive KP algorithm is capable of predicting the number of clusters present in the morphological image. Furthermore, it was shown that the adaptive KP algorithm reduces false alarms present in the morphological image. FIG. 15 is a block diagram of the adaptive KP algorithm.

As used herein, the terminology "target" means a person or persons, or portion thereof, animal or animals, object, or a combination thereof.

As used herein the terminology "point of interest" or "points of interest" refer to an signature or area in the image which appears to be a target but may or may not be a target; i.e., potentially the point of interest may be a target; subject to further processing or testing.

As used herein the terminology "subimage" or "sub image" means a portion of an image (also referred to herein as a patch), or the like.

As used herein, the "energy" corresponds to the intensity of the image pixels.

As used herein the terminology "processor" includes computer, controller, CPU, microprocessor; multiprocessor, minicomputer, main frame, personal computer, PC, coprocessor, and combinations thereof or any machine similar to a computer or processor which is capable of processing algorithms.

As used herein the terminology the terminology "process" means: an algorithm, software, subroutine, computer program, or methodology.

As used herein, the terminology "algorithm" means: sequence of steps using computer software, process, software, subroutine, computer program, or methodology.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of detecting moving targets comprising:
transmitting electromagnetic waves rays from a plurality of transmitters at sequential intervals;
receiving reflected waves into a plurality of receivers after each transmission; the compilation of the reflected waves from the plurality of receivers for each transmission representing a data frame;
forming a signal that monitors changes between the two sets of frames; at least one processor operating to process and compare frames;
forming a difference image using a back-projection algorithm;
scanning the difference image using a constant false alarm rate (CFAR) window; the CFAR window scanning the entire difference image and identifying a list of points of interest and eliminating the sidelobe artifacts present in the difference image thereby creating CFAR images;
processing the CFAR images using morphological processing to create a morphological image;
using K-means clustering to generate normalized minimized sum of squares (NMSOS) errors for the current morphological image, determining the number of clusters present in the morphological image by comparing the NMSOS errors for the current morphological image with a database of known NMSOS errors from previously inputted morphological images associated with known cluster numbers and determining the closest match;
using K-means clustering to indicate the centroid of each cluster; and
determining the presence or path of a target.

2. The method of claim 1 wherein the step of forming a signal comprises
forming the coherent difference between newly collected data profiles and the stored data profiles to obtain a new data set consisting of modified downrange profiles using the equation $\dot{f}_{i,j,k}(r)=f_{i+1,j,k}(r)-f_{i,j,k}(r)$, i=1, ..., N−1, j= 1, ..., M, and k=1, ..., Nc where M represents the number of transmitters, r represents the downrange index, i represents the time index, j represents the transmitter index, and k represents the receiver index, the difference signal, N is the total number of frames, and Nc the total number of clusters; $\dot{f}_{i,j,k}(r)$ being formed to monitor changes between the two sets of downrange profiles measured at time i and time i+1 using transmitter j and receiver k; and
the step of forming an image using a back projection algorithm comprises inputting the difference signal $\dot{f}_{i,j,k}(r)$ into an image formation routine which is a time-domain back-projection procedure, resulting in the output difference image $$I_{diff}(x,y) = \sum_{k=1}^{Nc} \sum_{j=1}^{M} \sum_{i=1}^{N-1} g(i,j,k) \dot{f}_{i,j,k}(r_{i,j,k})$$

where g(i,j,k) is a scaling function.

3. The method of claim 2 wherein the step of processing using the constant false alarm rate (CFAR) comprises performing a test of local contrast using a difference image $I_{diff}(x,y)$,
setting a CFAR window used to scan the difference image and test for the moving target signature; the CFAR window comprising:
an inner window having the cross range dimension $I_x$ and range dimension $I_y$,
a guard window having the cross range dimension $G_x$ and range dimension $G_y$, and
an outer window having the cross range dimension $O_x$ and range dimension $O_y$, and
wherein the inner windows dimensions are overlaid on the moving target signature, the outer window dimensions are superimposed on the background, and the guard window is used as a buffer between the inner and outer windows and ensures that large pixel values due to target sidelobes are not captured by the outer window.

4. The method of claim 3 wherein the step of processing using the constant false alarm rate (CFAR) comprises:
placing the CFAR window in the difference image of a predetermined size less than the difference image and moved, pixel by pixel over the entire difference image; and locating a moving target signature if the sum of the energy in the inner window is larger than the sum of the energy in the outer window.

5. The method of claim 4 wherein the inner window to outer window energy ratio is defined as $$R = \frac{\mu_i}{\mu_o}$$

where $$\mu_i = \sum_k \sum_l [\Phi(P_{(l,k)})]^2$$

is the sum of the energy in the inner window, $k=[Y-\lfloor I_y/2 \rfloor, \ldots Y+\lfloor I_y/2 \rfloor]$, $l=[X-\lfloor I_x/2 \rfloor, \ldots X+\lfloor I_x/2 \rfloor]$, and $P_{(i,k)}$ is the magnitude of the pixel at position (l,k) the function $\Phi(P_{(i,k)})$ is defined as $$\Phi(P_{(l,k)}) = \begin{cases} P_{(l,k)}, & P_{(l,k)} > \eta \\ \eta, & P_{(l,k)} \le \eta \end{cases}$$

where $\eta=\max(I_{diff}(x,y))/2$ and $\max(I_{diff}(x,y))$ is the maximum pixel magnitude in the difference image, and wherein $\Phi(P_{(i,k)})$ is used to adjust the image background and require that the magnitude of each pixel is above the threshold defined by $\eta$, such that errors are prevented due to division by very small numbers, and wherein the threshold $\eta$ is chosen based on the observations of the sidelobes corresponding to the moving target signature, which are typically less than max($I_{diff}$(x,y))/2 in magnitude, and wherein the choice of η eliminates the sidelobes by blending them into the background of the difference image and wherein the sum of the energy $\mu_o$, in the outer window is defined as $$\mu_o = E_W - E_{I+G},$$

where $$E_W = \sum_m \sum_n [\Phi(P_{(n,m)})]^2$$

is the sum of the energy in the entire CFAR window, m=[Y−⌊$O_Y$/2⌋, . . . Y+⌊$O_Y$/2⌋], n=[X−⌊$O_X$/2⌋, . . . X+⌊$O_X$/2⌋], and $E_{I+G}$ is defined as the sum of the energy in the guard and inner windows, such that $$E_{I+G} = \sum_q \sum_r [\Phi(P_{(r,q)})]^2$$

where q=[Y−⌊$G_Y$/2⌋, . . . Y+⌊$G_Y$/2⌋] and r=[X−⌊$G_X$/2⌋, . . . X+⌊$G_X$/2⌋]; and wherein a CFAR test is defined as $$\Psi = \begin{cases} 1 & R > 2 \\ 0 & \text{else,} \end{cases}$$

which requires that the sum of the energy in the inner window is more than twice the sum of the energy in the outer window;

whereby if Ψ=1, then the center pixel (at coordinates (X, Y)) is a point of interest corresponding to a potential moving target.

6. The method of claim 1 wherein targets are detected inside wood and/or cinderblock buildings.

7. The method of claim 1 wherein the step of processing the CFAR images using morphological processing operates to refine the number of clusters present in the CFAR images and implements a dilation procedure and an erosion procedure.

8. The method of claim 7 wherein the dilation procedure is designed to connect clusters in close proximity by dilating all pixels in each CFAR image by defining a dilation window $x_d$ as:

$$[\chi_d]_{17,17} = \begin{bmatrix} 1 & \cdots & 1 \\ \vdots & \ddots & \vdots \\ 1 & \cdots & 1 \end{bmatrix}$$

where the 17×17 dilation window size was chosen to connect clusters separated by a distance of 0.68 m or less, a distance was chosen based on observations of the clusters in the CFAR images, and wherein a dilation test statistic is defined:

$$\Psi_d = \begin{cases} 1, & \sum_{\alpha=1}^{17} \sum_{\beta=1}^{17} \chi_d(\alpha,\beta) \cdot C_i(j+\alpha-1, k+\beta-1) > 0 \\ 0, & \text{else} \end{cases}$$

for all j=1, . . . 484 and k=1, . . . 484, such that when the dilation window scans the CFAR image, $C_i$(x,y), an 8 pixel buffer exists along the edge of the CFAR image wherein there are not enough samples exist at the edges of the image and where there exist i=1, . . . N−1 dilation images; one for each CFAR image such that if $\Psi_d$=1 for a given i, j, k then a dilation occurs and $D_i$(j+8,k+8)=1, where $D_i$(x,y) is a dilation image of size (500×500) and if $\Psi_d$=0, then $D_i$(j+8, k+8)=0, and no dilation occurs.

9. The method of claim 7 wherein the erosion procedure is utilized to reduce the size of the clusters to their original size in the CFAR image; any clusters joined using the dilation process remaining joined after the erosion process, the erosion procedure comprising:

defining a 17×17 erosion window $x_e$ as $$[\chi_e]_{17,17} = \begin{bmatrix} 0 & \cdots & 0 & 1 & 0 & \cdots & 0 \\ \vdots & \ddots & \vdots & \vdots & \vdots & \ddots & \vdots \\ 0 & \cdots & 0 & \vdots & 0 & \cdots & 0 \\ 1 & \cdots & \cdots & 1 & \cdots & \cdots & 1 \\ 0 & \cdots & 0 & \vdots & 0 & \cdots & 0 \\ \vdots & \ddots & \vdots & \vdots & \vdots & \ddots & \vdots \\ 0 & \cdots & 0 & 1 & 0 & \cdots & 0 \end{bmatrix}$$

and wherein the erosion test statistic is defined as $$\Psi_e = \begin{cases} 1 & \gamma = \Omega \\ 0 & \text{else} \end{cases}$$

where $$\gamma = \sum_{\alpha=1}^{17} \chi_e(\alpha, 9) \cdot D_i(j+\alpha-1, k+8) + \sum_{\beta=1}^{17} \chi_e(9, \beta) \cdot D_i(j+8, k+\beta-1)$$

and Ω=34 is the erosion threshold, j=1, . . . 484, and k=1, . . . 484 such that there exist i=1, . . . N−1 erosion images; one for each dilation image, $D_i$(x,y), and if $\Psi_e$=1 for a given i, j, k, then $E_i$(j+8, k+8)=1, where $E_i$(x,y) is an erosion image of size (500×500) and if $\Psi_e$=0, then an erosion occurs and $E_i$(j+8, k+8)=0 and wherein the set of erosion images, {$E_1$(x,y) . . . $E_{N-1}$(x,y)}, is referred to as the morphological output images.

10. The method of claim 1 wherein the step of determining the number of clusters present in the morphological image comprises defining a cluster as a group of one or more points of interest that are close to one another in the morphological image;

identifying the number of clusters present in the morphological image.

11. The method of claim 10 wherein the step of using the k-Means processing comprises using an iterative procedure for minimizing the square-error between centroid estimates and their corresponding points of interest; the k-means processing comprising inputting the morphological image comprising a set of points of interest vectors, and a number representing the number of clusters into at least one processor to randomly generate a mean vector;

randomly generating T mean vectors correlating to a cluster centroid location;

using an iterative procedure to a) determining the mean vector nearest to each point of interest vector using the Euclidean distance measure;

b) estimating the error between the point of interest and the corresponding mean vector using a sum of squares error criterion, the error criterion being it measure of the variance between the points of interest vectors and the nearest mean vectors in order to minimize the error;

c) determining whether the error is greater than a predetermined value;

d) if the error is greater than a predetermined value, updating using mean vectors nearest points of interest and return to step a);

e) if the error is less than a predetermined value, then the final centroid estimates are represented by the mean vectors.

12. The method of claim 1 wherein the step of determining the presence or path of a target comprises using a tracker algorithm to reduce the number of false alarms and segregate targets from both clutter and one another as they move inside a building; wherein the centroids generated by the clustering algorithm serve as inputs to the tracker; so that it is possible to have multiple tracker inputs even when a single moving target is present in that the centroids may indicate the true position of a moving target or false alarms; the tracker algorithm operating to estimate the correlation between each centroid and the existing tracks and associate the existing tracks with the most highly correlated centroid, whereby non-assigned centroids are used to initiate new tracks and outdated tracks are deleted and the tracker algorithm determines the present track position and predicts the next measurement.

13. The method of claim 1 wherein the step of determining the number of clusters present in the morphological image comprises a heuristic approach to determine the number of clusters by:

repeating the k-Means clustering step for many different cluster number choices; wherein the maximum cluster number is denoted by C, to produce a set of minimized SOS errors $\hat{J}=\{\hat{J}_1, \hat{J}_1, \ldots \hat{J}_C\}$, where $\hat{J}_N$ is the $N^{th}$ minimized SOS error, and N=1, 2, ... C denotes the cluster number choice. $\hat{J}$ is normalized by max($\hat{J}$) to obtain:

$$J = \{\overline{J}_1, \overline{J}_2, \ldots \overline{J}_C\} = \hat{J}/\max(\hat{J})$$

where $\overline{J}$ is the $i^{th}$ normalized minimized SOS (NMSOS) error;

searching using a heuristic for a large drop in NMSOS error or "knee-point" where a large gap exists between predicted cluster numbers, thereby indicating that the predicted cluster number corresponds to the true number of clusters.

14. The method of claim 13 wherein the database of known NMSOS errors from previously inputted morphological images comprises training set information and further including the step of labeling each NMSOS error in the training set $\theta \in \{1, \ldots C\}$, indicating T, such that the training set comprises a set of M training vectors, $[\{J_1,\theta_1\}, \ldots \{J_M,\theta_M\}]$, consisting of the NMSOS errors and their corresponding labels, where $J_i = \{J_{i,1}, \ldots J_{i,C}\}$.

15. The method of claim 14 wherein for a predetermined morphological image with an unknown number of clusters, the NMSOS errors are first determined and denoted as $J_{morph} = \{J_{morph,1}, \ldots J_{morph,C}\}$, the k-Nearest Neighbor (k-NN) classifier then utilizes the training set to automatically determine the number of clusters, $N_p$, corresponding to the morphological image and the k-NN classifier first estimates the distance between $J_{morph}$ and $[J_1, \ldots J_M]$ based on Euclidean distance, denoting the distance values as $[\{d_1,\theta_1\}, \ldots \{d_M,\theta_M\}]$, where $$d_i = \sqrt{(\overline{J}_{i,1} - J_{morph,1})^2 + \ldots + (\overline{J}_{i,C} - J_{morph,C})^2}$$

and the distances are then sorted from smallest to largest to produce $[\{S_1,\theta_1\}, \ldots \{S_M,\theta_M\}]$, where $S_1$ corresponds to the smallest distance, $\theta_1$ corresponds to the label of the smallest distance, $S_M$ corresponds to the largest distance, and $\theta_M$ corresponds to the label of the largest distance; and subsequent to sorting, the labels of the K smallest distances, $[\theta_1, \ldots \theta_K]$, are examined based on a majority vote to define $[K_1, K_2, \ldots K_C]$ as a set corresponding to the number of labels in $[\theta_1, \ldots \theta_K]$ of each class, where a class denotes the number of clusters T.

16. A system for detecting moving targets, the system comprising a plurality of M transmitters, a plurality of receivers, and at least one memory, the transmitters operating in sequence to transmit electromagnetic waves rays sequentially; the receivers receiving reflected waves after each transmission; the compilation of the reflected waves from the plurality of receivers for each transmission representing a data frame; at least one processor operating to perform the steps of:

forming a signal that monitors changes between the two sets of frames; at least one processor operating to process and compare frames;

forming a difference image using a back-projection algorithm;

scanning the difference image using a constant false alarm rate (CFAR) window; the CFAR window scanning the entire difference image and identifying a list of points of interest and eliminating the sidelobe artifacts present in the difference image thereby creating CFAR images;

processing the CFAR images using morphological processing to create a morphological image;

using K-means clustering to generate normalized minimized sum of squares (NMSOS) errors for the current morphological image, determining the number of clusters present in the morphological image by comparing the NMSOS errors for the current morphological image with a database of known NMSOS errors from previously inputted morphological images associated with known cluster numbers and determining the closest match;

using K-means clustering to indicate the centroid of each cluster; and determining the presence or location of a target.

17. The system of claim 16 wherein the step of comparing the NMSOS errors is performed using a classifier and wherein the step of determining the presence or location of a target comprises using a tracker algorithm to establish a trajectory of the target based on the input centroids.

18. The system of claim 16 wherein point of interest is inside a cinderblock building and wherein the step of determining the presence or location of a target comprises tracking the centroid of each cluster to determine whether there are any moving targets inside the building.

19. The system of claim 16 wherein the step of determining the presence or location of a target comprises using a tracker algorithm to determine target tracks, and further comprising estimating the correlation between centroids and the existing tracks and then associating the existing tracks with the most highly correlated centroid.

* * * * *